US012774151B2

(12) United States Patent
Trivelli et al.

(10) Patent No.: US 12,774,151 B2
(45) Date of Patent: Oct. 27, 2026

(54) CAPSULE FOR BEVERAGES, MACHINE FOR FILLING CAPSULES AND ASSOCIATED METHOD

(71) Applicant: 77 VISION WAY LTD, Belfast (GB)

(72) Inventors: Gianpaolo Trivelli, Pavia (IT); Gianluigi Trivelli, Pavia (IT); Claudio Raggi, Terni (IT); Mauro Gazzelli, Lugano-Aldesago (CH)

(73) Assignee: 77 VISION WAY LTD, Belfast (GB)

( * ) Notice: Subject to any disclaimer, the term of this patent is extended or adjusted under 35 U.S.C. 154(b) by 138 days.

(21) Appl. No.: 18/710,991

(22) PCT Filed: Nov. 16, 2022

(86) PCT No.: PCT/IB2022/061019
§ 371 (c)(1),
(2) Date: May 16, 2024

(87) PCT Pub. No.: WO2023/089492
PCT Pub. Date: May 25, 2023

(65) Prior Publication Data

US 2025/0011072 A1 Jan. 9, 2025

(30) Foreign Application Priority Data

Nov. 16, 2021 (IT) ........................ 102021000029042

(51) Int. Cl.
*B65D 83/48* (2006.01)
*A23L 2/54* (2006.01)
(Continued)

(52) U.S. Cl.
CPC ................ *B65D 83/48* (2013.01); *A23L 2/54* (2013.01); *B65B 3/10* (2013.01); *B65B 31/003* (2013.01); *B65B 31/025* (2013.01); *B65D 83/42* (2013.01)

(58) Field of Classification Search
CPC ....... B65B 31/003; B65B 3/10; B65B 31/025; B65D 83/42; F16K 1/30
(Continued)

(56) References Cited

U.S. PATENT DOCUMENTS 3,613,954 A * 10/1971 Bayne .................. B67D 1/0412 222/61
5,413,230 A 5/1995 Folter et al.
(Continued)

FOREIGN PATENT DOCUMENTS

EP 0258057 A2 3/1988
EP 2730523 A1 5/2014
(Continued)

OTHER PUBLICATIONS

Ministero Dello Sviluppo Economico, Search report for priority application IT 102021000029042, Jun. 21, 2022, Roma, Italy.
(Continued)

*Primary Examiner* — Jason K Niesz
(74) *Attorney, Agent, or Firm* — Underwood & Associates, LLC

(57) ABSTRACT

The present disclosure concerns a capsule for beverages (300) comprising a body having a head portion (302) and a bottom portion (301) and suitable for defining a cavity (300*c*) configured for containing, in use, a fluid and/or a gas; the capsule for beverages comprises an orifice (306) configured for allowing the release of said fluid and/or gas from the cavity. A seal (305) is movable between at least a first position suitable for determining a closing of the orifice (306) configuring the capsule for beverages (300) in a closed operating configuration, and a second position suitable for determining an opening of the orifice (306) configuring the capsule for beverages (300) in an open operating configuration. The disclosure concerns a machine for filling cap-
(Continued)

sules for beverages, comprising: —at least a seat (200, 200') configured for housing at least a capsule for beverage (300), to fill with a gas and/or with a fluid solution, in particular with a mineralized solution; —at least an injection system (201, 400, 401, 402) configured for operatively coupling with said capsule (300) and for supplying in pressurized way, in use, said gas and/or said fluid solution, in particular said mineralized solution, within the capsule (300); wherein the machine comprises at least an operating configuration of capsules filling, within which the seat (200, 200') and/or the injection system (201, 400, 401, 402) are placed under pressure in order to determine a transfer of said gas and/or said fluid solution within the capsule (300).

6 Claims, 5 Drawing Sheets

(51) Int. Cl.

| | |
|---|---|
| ***B65B 3/10*** | (2006.01) |
| ***B65B 31/00*** | (2006.01) |
| ***B65B 31/02*** | (2006.01) |
| ***B65D 83/42*** | (2006.01) |

(58) Field of Classification Search
USPC .............................................................. 215/5
See application file for complete search history.

(56) References Cited

U.S. PATENT DOCUMENTS

| | | | | |
|---|---|---|---|---|
| 6,378,570 | B1 * | 4/2002 | Shipachev | F17C 13/04 141/3 |
| 7,185,674 | B2 * | 3/2007 | Taylor | A62B 9/02 137/550 |
| 2014/0078857 | A1 | 3/2014 | Nelson | |

FOREIGN PATENT DOCUMENTS

| | | | |
|---|---|---|---|
| KR | 20170120340 | A | 10/2017 |
| WO | 95/04689 | A1 | 2/1995 |
| WO | 2021037385 | A1 | 3/2021 |

OTHER PUBLICATIONS

European Patent Office, International Search Report for PCT/IB2022/061019, Jun. 23, 2023, European Patent Office, P.B. 5818 Patentlaan 2, NL—2280 HV Rijswijk.

European Patent Office, Search Strategy for International Search Report for PCT/IB2022/061019, Jun. 23, 2023, European Patent Office, P.B. 5818 Patentlaan 2, NL—2280 HV Rijswijk.

European Patent Office, Written Opinion of the International Searching Authority for PCT/IB2022/061019, Jun. 23, 2023, European Patent Office, P.B. 5818 Patentlaan 2, NL—2280 HV Rijswijk.

* cited by examiner

FIG.5
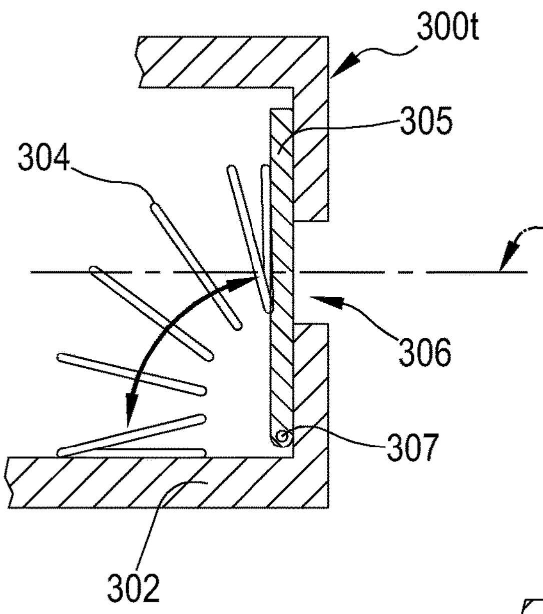
FIG.6
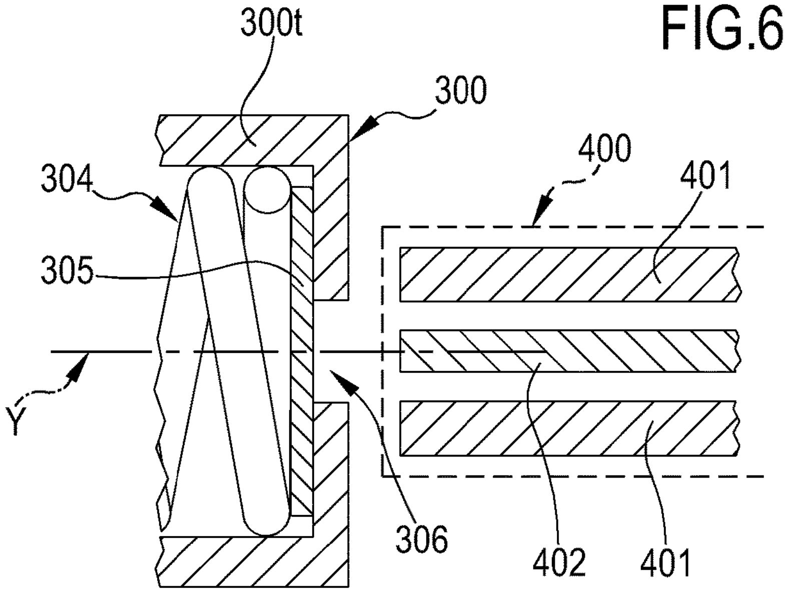
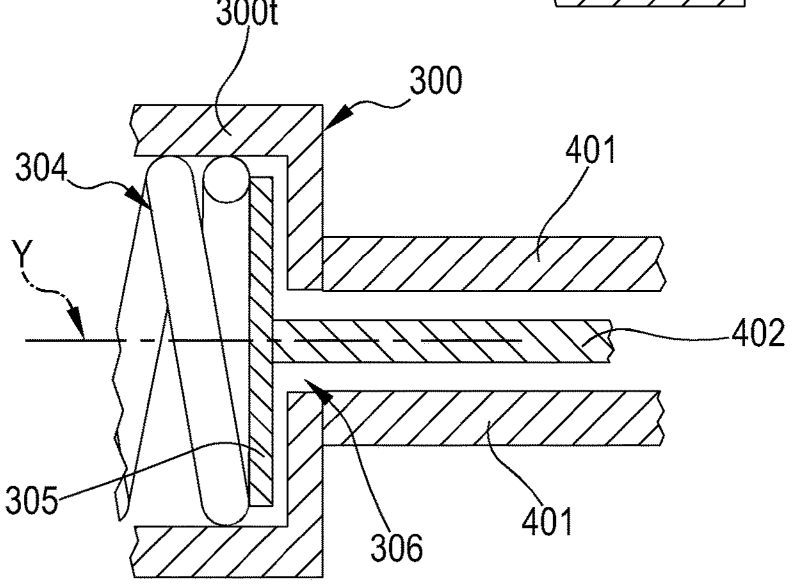
FIG.7

FIG.8
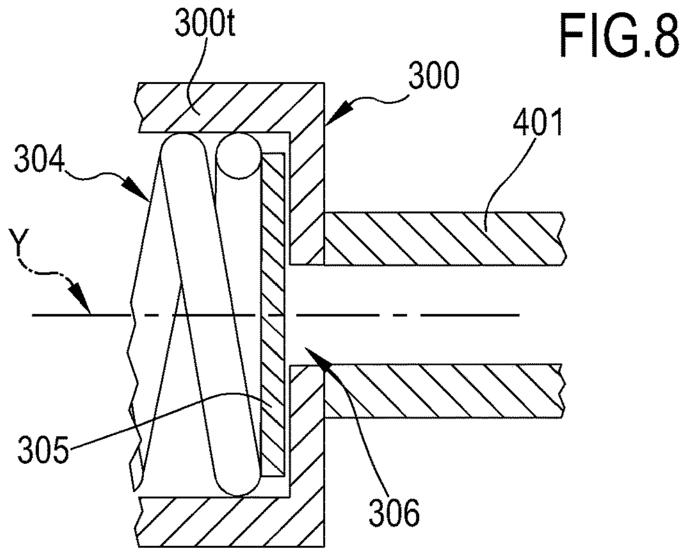
FIG.9
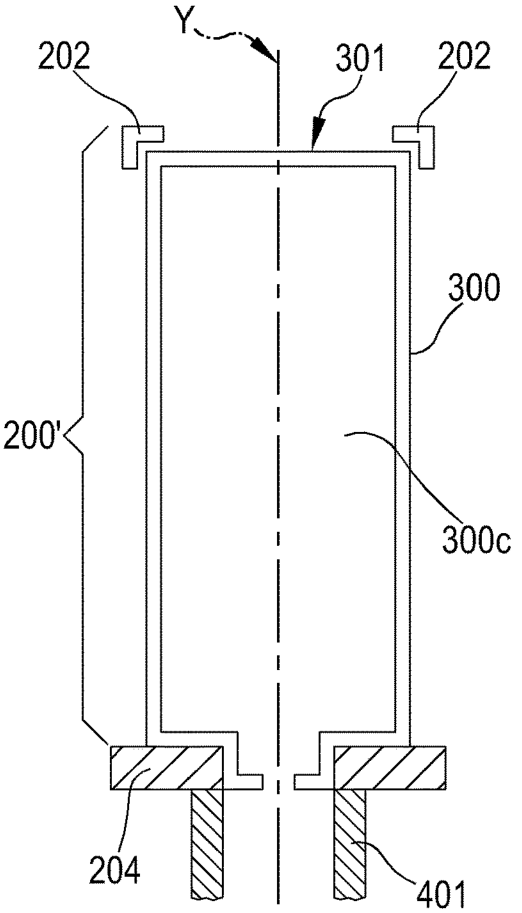
FIG.10
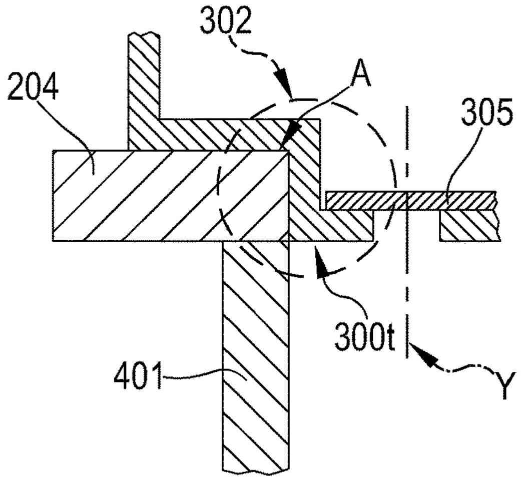
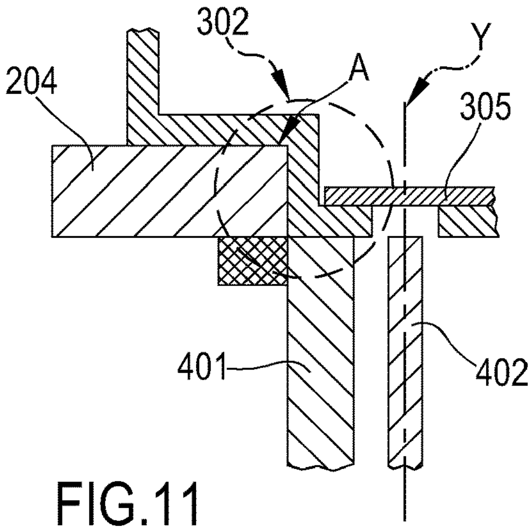
FIG.11

CAPSULE FOR BEVERAGES, MACHINE FOR FILLING CAPSULES AND ASSOCIATED METHOD

TECHNICAL FIELD

The present disclosure refers to the field of devices of supplying of substances for food applications and concerns the field of machines for filling capsules under pressure.

In detail, the present disclosure concerns a capsule for beverages, and concerns also a machine for filling capsules and an associated method.

BACKGROUND ART

During the last years have been spreading devices for the preparation of beverages starting from capsules. These devices for the preparation of beverages quickly spread for home applications and for small businesses, subsequently. In particular, are known machines of "table-top" type that contain a small water tank and that supply coffee, tea or infusions. These capsules, that in the present disclosure will be defined capsule for beverages, are typically configured for containing substances in granules or powder. Coffee, tea or infusion is supplied by making flow, in use, part of the water contained in the small tank of the machine within the capsule, realizing the beverage. Typically, the water that is flown within the capsule is at first heated and this allows an appropriate extraction of flavors of coffee, tea or infusion. In order to flow the water within the capsule, typically the capsule is perforated in a predetermined position; some capsules show an outlet pipe from which the beverage can flow.

There are also known carbonation devices, among which the most famous are the Sodastream™ devices. These devices are conceived with the purpose of injecting carbon dioxide in the water, in order to render it gasified.

The water is at first positioned in a bottle that is firmly connected to the carbonating device. An injector, in use partially introduced under the maximal height reached by the water in the bottle, injects—upon control of the user—a determined amount of carbon dioxide in order to gasify the water.

There are also known substantially homemade filters for the removal of determined minerals from the water, configured for allowing the user to drink water of which the content, for example, of limestone, or polluting substances is significantly reduced by means of filtering processes according to various technologies.

TECHNICAL PROBLEM SOLVED AND DISCOVERY OF THE APPLICANT

In the specific field of water carbonating devices of known type, and more generally in the field of supplying devices of drinking water, until now no one has raised the issue of the organoleptic properties of the water and of its correct mineral content.

The Applicant has observed that exists an interest of the market towards the production of waters, for example to drink or destined to sanitary applications, whose mineral content can be chosen and appropriately selected by the user.

In particular the Applicant has observed that determined waters, poor in minerals or previously demineralized, can be mineralized through mineralized solutions contained in determined capsules.

In particular the Applicant has conceived a capsule for beverages which, in use, contains a mineralized solution destined to be used for mineralizing waters destined to the human consumption.

The Applicant has also conceived a machine for filling capsules, and an associated method, which are destined to allow the mineralization of waters destined to the human consumption.

A purpose in particular of the present disclosure is to describe an innovative capsule for beverages, which can allow the realization of waters mineralized with mineralized solution of different composition.

A purpose of the present disclosure is also to describe an innovative capsule for beverages, which is of easy and safe use.

A purpose of the present disclosure is also to describe a capsule for beverages that allows an efficient extraction of substantially the whole content thereof.

A purpose of the present disclosure is also to describe a machine for filling the capsules for beverages which allows to fill—at least partially—capsules for beverages with mineralized solutions of different composition.

A purpose of the present disclosure is to describe a machine for filling the capsules for beverages which allows to fill at least a capsule for beverages in a substantially quick, easy and safe way.

A purpose of the present disclosure is also to describe a method for filling a capsule for beverages, efficient from the industrial and/or chemical point of view, and/or which is easy and safe to implement.

SUMMARY

The present summary shows the salient aspects of the object of the present disclosure; these aspects can be combined among them and/or with portions of the detailed description and/or with the attached claims.

Device for Water Treatment

According to the present disclosure it is first of all described a device (1) for water treatment, comprising:

- a container (2) configured for containing, in use, a predetermined amount of water (100) to mineralize;
- at least a supply input (14) for a mineralizing substance(S) to solubilize in said water (100);
- a mineral solubilization gas (G) supplying pipe (7), opening itself in said container (2) and configured for supplying a gas within said water (100), said gas (G) being destined to allow a solubilization of said mineralizing substance in water;
- the device (1) comprising at least an operating configuration of mineralization, wherein the container (2) is pressurized through the mineral solubilisation gas (G) supplied within said container (2), and in particular is brought and/or kept at a pressure at least equal to a predefined pressure value (P1), said pressure being higher than the environmental pressure, and wherein the mineralizing substance(S) chemically reacts with said gas (G) determining a mineralization of the water with a solubilized compound.

According to another non-limiting aspect, the container (2) is realized in a metallic and/or plastic material, optionally a container realized in human consumption compatible material.

According to another non-limiting aspect, said metallic material comprises steel, in particular stainless steel.

According to another non-limiting aspect, in said operating configuration of mineralization, said container (2) is substantially insulated from the external environment.

According to another non-limiting aspect, the device (1) comprises a water recirculation system (9, 11) configured for collecting at least part of said water (100) from the container (2) and for reintroducing said at least part of said water (100) within said container (2) in correspondence of an upper portion of said container (2).

According to another non-limiting aspect, the device (1) comprises a dispenser (6*g*, 6*h*) configured for causing, in use, a flow of water (100), in particular a rain and/or a nebulization of water (100) in a portion of said container (2) saturated of said mineral solubilisation gas (G).

According to another non-limiting aspect, the dispenser (6*g*, 6*h*) is positioned in substantial correspondence of a head portion of the container (2) and/or at a predefined height (h1) above a height locally assumed by the water (100) within said container (2).

According to another non-limiting aspect, the device (1) comprises a first opening (10) for the collection of water, connected with said water recirculation system (9, 11), the first opening (10) for the collection of water being positioned in a lower portion of the container (2).

According to another non-limiting aspect, the first opening (10) is positioned in a bottom portion of the container (2).

According to another non-limiting aspect, the device (1) comprises a second opening (6) for the injection of water, connected with said water recirculation system (9, 11), the second opening (6) for introducing water being positioned in an upper portion of the container (2).

According to another non-limiting aspect, the second opening (6) is positioned in a head or upper portion of the container (2).

According to another non-limiting aspect, the first opening (10) and the second opening (6) are axially aligned along a respective axis (X).

According to another non-limiting aspect, the water recirculation system (9, 11) comprises at least a pipe (9) connected between said first opening (10) and said second opening (6).

According to another non-limiting aspect, the water recirculation system (9, 11) comprises at least a pump (11), positioned in correspondence of said pipe (9) and configured for forcing, at least during said operating configuration of mineralization, a flow of water (100) from the first opening (10) to the second opening (6) through said pipe (9).

According to another non-limiting aspect, said pipe (9) is realized in metallic material, preferably steel and even more preferably stainless steel.

According to another non-limiting aspect, the pipe (9) is directly connected with said first opening (10) and with said second opening (6).

According to another non-limiting aspect, the device (1) comprises at least a suction pipe (15) configured for allowing a gas extraction from said container (2).

According to another non-limiting aspect, the device (1) comprises at least an operating configuration of gas removal, wherein the container (2) is positioned at a pressure lower than the environmental pressure, determining a gas removal from said water (100).

According to another non-limiting aspect, the device (1) is configured for activating or actuating firstly the operating configuration of gas removal, and for activating or actuating subsequently the operating configuration of mineralization.

According to another non-limiting aspect, the device (1) comprises at least a cooling and/or thermal insulating device (12, 13*a*, 13*b*) arranged in correspondence of at least one between said water recirculation system (9, 11) or said container (2) and destined to determine a cooling of the container (2) and/or of the water (100) in use contained in the container (2) at an optimal temperature (T1) for the absorption of said mineralization gas, and/or destined to keep said cooling of the container (2) and/or of the water (100) in use contained in the container (2).

According to another non-limiting aspect, the cooling and/or thermal insulating device (12, 13*a*, 13*b*) comprises an active cooler (13*a*, 13*b*).

According to another non-limiting aspect, the device (1), in said operating configuration of mineralization is configured for bringing and/or keeping said water (100) at said optimal temperature (T1) for the absorption of said mineralization gas and for keeping, at the same time, the predefined pressure value (P1) within said container (2).

According to another non-limiting aspect, said mineralization gas (G) comprises carbon dioxide ($CO_2$).

According to another non-limiting aspect, said mineralizing substance comprises at least one between a calcium compound and a magnesium compound, optionally comprising carbonic acid ($H_2CO_3$).

According to another non-limiting aspect, said operating configuration of mineralization is destined to allow the production of water (100) with calcium bicarbonate ($Ca(HCO_3)_2$).

According to another non-limiting aspect, an assembly formed by the recirculation system (9, 11) and by the container (2) realizes, at least when the device (1) is in said mineralization configuration, a closed water recirculation circuit (100).

According to another non-limiting aspect, the device (1) comprises a temperature sensor, configured for detecting a temperature of the water (100) contained in the container (2) and/or in the pipe (9).

According to another non-limiting aspect, the device (1) comprises a data processing unit operatively connected with the temperature sensor and with the active cooler (13*a*, 13*b*).

According to another non-limiting aspect, the data processing unit is configured for adjusting an intervention of the active cooler for keeping said optimal temperature (T1) for the absorption of said gas in a predefined range or value on the basis of a temperature signal sent to the data processing unit from said temperature sensor;

- optionally said predefined range being [0-10]° C., more preferably [3-7]° C.;
- optionally, said optimal temperature (T1) for the absorption of said gas (G) being substantially equal to 5° C.

Water Treatment Method

According to the present disclosure it is described a water treatment method, comprising:

- the introduction of a predetermined amount of water (100) to mineralize in a container (2);
- an introduction of a mineralizing substance(S) in said water (100), the introduction taking place through a supply input (14) arranged on said container (2);
- an introduction in the water (100) contained in said container (2), through a gas supplying pipe (7) opening itself in said container (2), of a gas destined to allow a solubilisation of said mineralizing substance in water;
- a step of pressurization of the container (2) through the mineral solubilisation gas (G) supplied within said container (2), comprising bringing and/or keeping the container (2) at a pressure at least equal to a predefined pressure value (P1), said pressure being higher than the environmental pressure, a mineralization of the water (100), determined by a chemical reaction between said gas (G) and said mineralizing substance(S), said mineralization of the water (100) determining the production of mineralized water with a solubilized compound deriving from said chemical reaction between said gas (G) and said mineralizing substance(S).

According to another non-limiting aspect, the method comprises a step of recirculation of the water (100) contained in the container (2) through a water recirculation system (9, 11).

According to another non-limiting aspect, said step of recirculation of the water (100) comprises:

a collection of at least part of the water (100) contained in the container (2); and a subsequent reintroduction of said at least part of said water (100) within said container (2) in correspondence of an upper portion of said container (2).

According to another non-limiting aspect, said reintroduction takes place at least through a dispenser (6*g*, 6*h*) of the water recirculation system (9, 11) and determines a flow of water (100), in particular a rain and/or a nebulization of water (100) in a portion of said container (2) saturated with said mineral solubilisation gas (G).

According to another non-limiting aspect, the dispenser (6*g*, 6*h*) is positioned in substantial correspondence of a head portion of the container (2) and/or at a predefined height (h1) above a height locally assumed by the water (100) within said container (2) and the flow of water (100) comprises a fall of said rain and/or of said nebulization of water (100) for a height difference between the height (h2) existing between said dispenser (6*g*, 6*h*) and a height at which lies, in use, said water (100) within said container.

According to another non-limiting aspect, the step of recirculation of the water (100) comprises the collection of at least part of the water (100) contained in the container (2) and takes place in correspondence of a first opening (10) for the collection of water, positioned in a lower portion of the container (2), said first opening (10) being connected with the water recirculation system (9, 11).

According to another non-limiting aspect, the step of recirculation of the water (100) comprises the subsequent reintroduction of said at least part of said water (100) within said container (2) in correspondence of a second opening (6) for introducing water positioned in an upper portion of the container, said second opening being connected with the water recirculation system (9, 11).

According to another non-limiting aspect, the step of recirculation of the water (100) comprises a flow of water (100) in a pipe (9) of said water recirculation system (9, 11).

According to another non-limiting aspect, said flow takes place between said first opening (10) and said second opening (6), and is forced in said pipe (9) through a pump (11) of said water recirculation system (9, 11).

According to another non-limiting aspect, the method comprises a step of gas removal, wherein the container (2), through at least a suction pipe (15), is at a pressure lower than the environmental pressure determining a gas removal from said water (100).

According to another non-limiting aspect, the step of gas removal precedes the step of mineralization.

According to another non-limiting aspect, the method comprises a step of cooling of the container (2) and/or of the water (100) in use contained in said container (2) through at least a cooler and/or thermal insulation device (12, 13*a*, 13*b*).

According to another non-limiting aspect, said step of cooling is destined to determine a cooling of the container (2) and/or of the water (100) in use contained in the container (2) at an temperature (T1) optimal for the absorption of said mineralization gas, and/or to keep said cooling of the container (2) and/or of the water (100) in use contained in the container (2).

According to another non-limiting aspect, in the step of mineralization said water (100) is brought and/or kept at said optimal temperature (T1) for the absorption of said mineralization gas and, at the same time, the predefined pressure value (P1) is kept within said container (2).

According to another non-limiting aspect, said mineralization gas (G) comprises carbon dioxide ($CO_2$), and said mineralizing substance comprises at least one between a calcium compound and a magnesium compound, optionally comprising carbonic acid ($H_2CO_3$).

According to another non-limiting aspect, said step of mineralization is destined to allow the production of water (100) with calcium bicarbonate ($Ca(HCO_3)_2$).

According to another non-limiting aspect, the step of recirculation of the water (100) is a step of closed circuit recirculation in an assembly formed by the recirculation system (9, 11) and by the container (2) and takes place in correspondence of said step of mineralization.

According to another non-limiting aspect, the method comprises a step of detection of temperature of the water (100) contained in the container (2) and/or in the pipe (9) with a temperature sensor.

According to another non-limiting aspect, the method comprises a transmission of a temperature signal from said temperature sensor to a data processing unit operatively connected with the temperature sensor and with the active cooler (13*a*, 13*b*).

According to another non-limiting aspect, the method comprises a adjustment of an intervention of the active cooler (13*a*, 13*b*) with a control determined by the data processing unit, for keeping said optimal temperature (T1) for the absorption of said gas (G) in a predefined range or value on the basis of a temperature signal sent to the data processing unit by said temperature sensor;

optionally said predefined range being [0-10]° C., more preferably [3-7]° C.;

optionally, said optimal temperature (T1) for the absorption of said gas (G) being substantially equal to 5° C.

Computer Program

According to the present disclosure it is described a computer program configured for being executed by at least a data processing unit; the computer program comprising portions of software code that, when executed, cause the execution of one or more of the steps of the method according to one or more of the aspects here described.

Use

According to the present disclosure it is described a use of the device (1) according to one or more of the present aspects, for the production of mineralized water destined to sanitary applications and/or human consumption.

According to the present disclosure it is described a use of the device (1) according to one or more of the present aspects, for the production of mineralized water destined to water mineralization capsules, in particular to water mineralization capsules destined to sanitary applications and/or human consumption.

Capsule for Beverages

According to the present disclosure it is also described a capsule for beverages (300), comprising a body having a head portion (302) and a bottom portion (301) and suitable for defining a cavity (300*c*) configured for containing, in use, a fluid and/or a gas;

said capsule for beverages comprising an orifice (306) configured for allowing the release of said fluid and/or gas from the cavity (300*c*);

said capsule for beverages comprising a seal (305) movable between at least a first position suitable for determining a closing of the orifice (306) configuring the capsule for beverages (300) in a closed or sealed operating configuration wherein the cavity (300*c*) is insulated, and a second position suitable for determining an opening of the orifice (306) configuring the capsule for beverages (300) in an open operating configuration wherein the cavity (300*c*) is accessible from the outside of the capsule for beverages (300);

the capsule for beverages (300) being configured for remaining, in rest conditions, in said closed operating configuration keeping the seal (305) in said first position.

According to another non-limiting aspect, the capsule for beverages (300) is configured for allowing the movement of the seal (305) from said first position to said second position and/or for switching between said closed operating configuration and said open operating configuration by means of an external force.

According to another non-limiting aspect, in said closed operating configuration, the cavity (300*c*) is pressurized.

According to another non-limiting aspect, in said closed operating configuration, the cavity (300*c*) is pressurized at a pressure higher with respect to the environmental pressure.

According to another non-limiting aspect, when in said second position, the seal (305) allows the release of at least part of the pressure contained in the cavity (300*c*).

According to another non-limiting aspect, the seal (305) is positioned within said cavity (300*c*) in substantial correspondence of the orifice (306).

According to another non-limiting aspect, the body of the capsule for beverages (300) comprises a striking wall for said seal (305).

According to another non-limiting aspect, the body of said capsule for beverages (300) and/or said seal (305) is configured for withstanding a pressure at least equal to 2 bar, preferably at least equal to 3 bar, even more preferably at least equal to 4 bar.

According to another non-limiting aspect, said striking wall surrounds the orifice (306).

According to another non-limiting aspect, in said first position the seal (305) is in contact with said striking wall.

According to another non-limiting aspect, the seal (305) is configured for moving between said first position and said second position through at least one between: a translation movement, in particular a substantially linear translation movement, and a rotation movement.

According to another non-limiting aspect, the seal (305) is configured for moving between said first position and said second position through a composite movement of roto-translation.

According to another non-limiting aspect, the capsule for beverages (300) shows a substantially axial development along a maximal extension direction (Y).

According to another non-limiting aspect, the bottom portion (301) is opposed with respect to the head portion (302) along said maximal extension direction (Y).

According to another non-limiting aspect, the bottom portion (301) comprises at least a bottom portion and the head portion (302) comprises at least a head wall (300*t*), at least one between the bottom wall and/or the head wall (300*t*) being substantially inclined, in particular substantially orthogonal, with respect to the maximal extension direction (Y).

According to another non-limiting aspect, the orifice (306) is positioned in substantial correspondence of the head portion (302).

According to another non-limiting aspect, the orifice (306) is positioned on said head wall (300*t*).

According to another non-limiting aspect, the orifice (306) shows an axis substantially parallel to the maximal extension direction (Y); optionally the orifice (306) showing an axis substantially coincident with the maximal extension direction (Y).

According to another non-limiting aspect, said head portion (302) defines an end portion of said cavity (300*c*) having tapered cross section with respect to a central portion of said cavity (300*c*).

According to another non-limiting aspect, the seal (305) shows a cross section lower with respect to the cross section of said head portion (302).

According to another non-limiting aspect, the capsule for beverages (300) comprises a central portion of said body, having an own cross section, and the head portion (302) is tapered, and has a cross section of a size lower with respect to the cross section of the central portion of the body.

According to another non-limiting aspect, the capsule for beverages (300) comprises an elastic element (304) configured for keeping the seal (305) in said first position in a rest configuration, in particular configured for exerting a force on the seal (305) such as to force the keeping of said first position by withstanding the movement of the seal (305) from said first position to said second position.

According to another non-limiting aspect, the elastic element (304) comprises at least a spring having a portion, in particular an end, fixed to said seal (305).

According to another non-limiting aspect, the elastic element (304) is interposed between the bottom portion (301) and the seal (305).

According to another non-limiting aspect, said elastic element (304) is configured for being compressed when the capsule passes from said closed operating configuration to an open operating configuration.

According to another non-limiting aspect, said seal (305) is realized in a flexible material, in particular in a polymeric material; said polymeric material optionally comprising silicone.

According to another non-limiting aspect, said seal (305) is configured for deforming by coupling to a shape and/or roughness of an inner face of said striking wall.

According to another non-limiting aspect, said capsule for beverages (300) is reusable and/or said seal (305) is movable a plurality of times between said first position and said second position.

According to another non-limiting aspect, said spring is interposed substantially between said bottom portion (301) and said head portion (302).

According to another non-limiting aspect, said capsule for beverages (300) is reusable.

According to another non-limiting aspect, said capsule for beverages (300) is realized at least partially in metallic material; in particular the body of the capsule for beverages (300) is realized at least partially in metallic material; said metallic material comprising optionally iron, in particular steel, and/or brass.

According to another non-limiting aspect, said capsule for beverages (300) is realized in a carbon dioxide-resistant material.

According to another non-limiting aspect, the body of the capsule for beverages (300) is openable.

According to another non-limiting aspect, the body of the capsule for beverages (300) comprises at least a demountable portion for allowing an operating access to said cavity (300*c*); said demountable portion optionally being said bottom portion (301).

According to another non-limiting aspect, the bottom portion (301) comprises at least a threading configured for removably coupling with a counter-threading con carried out on a central portion of the body of the capsule for beverages (300).

According to another non-limiting aspect, said capsule for beverages (300) comprises a connector engageable on a predetermined portion of a machine for filling capsules, said connector optionally comprising at least one between a bayonet connector or a screwable connector.

According to another non-limiting aspect, said connector is positioned in substantial correspondence of the head portion (302).

According to another non-limiting aspect, the head portion (302) detects a neck or undercut with said central portion.

Machine for Filling Capsules

According to the present disclosure it is here described a machine for filling capsules for beverages, comprising:

- at least a seat (200, 200') configured for housing at least a capsule for beverages (300) to fill with a gas and/or with a fluid solution, in particular with a mineralized solution;
- at least an injection system (201, 400, 401, 402) configured for operatively coupling itself with said capsule for beverages (300) and for supplying in pressurized way, in use, said gas and/or said fluid solution, in particular said mineralized solution, within the capsule for beverages (300);
- wherein the machine for filling capsules for beverages comprises at least an operating configuration of capsules filling, within which the seat (200, 200') and/or the injection system (201, 400, 401, 402) are placed under pressure in order to determine a transfer of said gas and/or said fluid solution, in particular said mineralized solution, within the at least one capsule for beverages (300).

According to the present disclosure it is here described a machine for filling capsules for beverages, comprising:

- at least a chamber (200) configured for housing at least a capsule for beverages (300) to fill with a gas and/or with a fluid solution, in particular with a mineralized solution;
- at least an injection system (201, 400, 401, 402) configured for operatively coupling itself with said capsule for beverages (300) and for supplying in pressurized way, in use, said gas and/or said fluid solution, in particular said mineralized solution, within the capsule for beverages (300);
- wherein the machine for filling capsules for beverages comprises at least an operating configuration of capsules filling, within which the chamber (200) is insulated from the external environment and is placed under pressure, by means of said injection system (201, 400, 401, 402) in order to determine a transfer of said gas and/or said fluid solution, in particular said mineralized solution, within the at least one capsule for beverages (300).

According to another non-limiting aspect, the injection system (201, 400, 401, 402) is configured for supplying in pressurized way, in use, said gas and/or said fluid solution, in particular said mineralized solution, within the capsule for beverages (300) through an orifice (306) of the capsule for beverages (300).

According to another non-limiting aspect, said capsule for beverages (300) is a capsule according to one or more of the aspects here described.

According to another non-limiting aspect, said gas is the solubilization gas (G).

According to another non-limiting aspect, the seat (200, 200') comprises at least a chamber (200) configured for housing, in use, at least a capsule for beverages (300).

According to another non-limiting aspect, said seat (200, 200') comprises a retaining block (202) configured for retaining the at least one capsule for beverages (300) in substantial correspondence of at least a predefined position in said seat (200, 200'); said retaining block (202) being configured for retaining said capsule for beverages (300) in correspondence of a predefined portion thereof, optionally being configured for retaining the capsule for beverages (300) in substantial correspondence of said bottom portion (301).

According to another non-limiting aspect, the retaining block (202) is elastic, and when the capsule for beverages (300) is introduced in said seat (200, 200'), said retaining block (202) undergoes a deformation exerting a retaining force on the capsule for beverages (300).

According to another non-limiting aspect, said retaining block (202) is movable between a first position and a second position;

- said first position being a rest position and/or said second position being an unstable position.

According to another non-limiting aspect, said machine comprises at least a spring configured for forcing the retaining block (202) in said first position or comprises at least a servo-actuator configured for moving the retaining block (202) between said first and said second position.

According to another non-limiting aspect, said machine comprises a data processing unit, configured at least for controlling said servo-actuator during the movement of the retaining block (202) between said first and said second position.

According to another non-limiting aspect, the machine is configured for activating the injection system (201, 400, 401, 402) after a closing of said chamber (200), said closing determining an insulation of the chamber (200) from the external environment.

According to another non-limiting aspect, said chamber (200) is configured for being placed under pressure in order to supply in pressurized way, in use, said gas and/or said fluid solution, in particular said mineralized solution, within the capsule for beverages (300).

According to another non-limiting aspect, said chamber (200) is configured for being placed under pressure at least in said operating configuration of capsules filling.

According to another non-limiting aspect, said chamber (200) comprises at least an openable and lockable cover; in said closed operating configuration said cover determining an insulation of the chamber (200) from the external environment.

According to another non-limiting aspect, the movement of said cover determines a movement of said retaining block (202) between said first position and said second position.

According to another non-limiting aspect, said cover is configured for rotating and/or sliding between an open position and a closed position.

According to another non-limiting aspect, said machine comprises an operating configuration of introduction or extraction of said at least one capsule for beverages (300) from said seat (200, 200'), wherein said injection system (201, 400, 401, 402) is not pressurized.

According to another non-limiting aspect, said machine comprises an operating configuration of introduction or extraction of said at least one capsule for beverages (300) from said chamber (200), wherein said chamber (200) is not pressurized and/or wherein said cover is in said open position.

According to another non-limiting aspect, the injection system (201, 400, 401, 402) comprises an opening for the access of gases and/or fluids (201) opening itself in said chamber (200), said opening for the access of gases and/or fluids (201) being configured for supplying at least one between said gas and/or said fluid solution, in particular said mineralized solution.

According to another non-limiting aspect, the injection system (201, 400, 401, 402) comprises at least a filling element (400) in its turn comprising a pin (402) configured for causing, in particular for forcing by contact, a movement of a seal (305) of the capsule for beverages (300) between a first position wherein the seal (305) closes a cavity of the capsule for beverages (300) and a second position wherein the seal (305) opens the cavity of the capsule for beverages (300).

According to another non-limiting aspect, said pin (402) is configured for causing, during the movement of the seal (305) of the capsule for beverages (300) between the first position wherein the seal (305) closes a cavity of the capsule for beverages (300) and a second position wherein the seal (305) opens the cavity of the capsule for beverages (300), a compression of the elastic element (304).

According to another non-limiting aspect, said injection system (201, 400, 401, 402) comprises at least a filling element (400) configured for entering in substantial contact with a predetermined portion of the capsule for beverages (300), optionally with said head portion (302) and/or said orifice (306), said filling element (400) being configured for forcing a supply of said gas and/or of fluid solution, in particular said mineralized solution, in the cavity (300*c*) of said capsule for beverages (300).

According to another non-limiting aspect, said filling element (400), and/or said pin (402), is movable, between a first position wherein it is spaced with respect to said capsule for beverages (300) and a second position wherein it is in substantial contact with said capsule for beverages (300).

According to another non-limiting aspect, said filling element (400), and/or said pin (402), is movable, between a first position wherein it is spaced with respect to said capsule for beverages (300) and a second position wherein it is in substantial contact with an orifice (306) of the capsule for beverages (300).

According to another non-limiting aspect, said orifice (306) is connected with said cavity, and allows at least a partial emptying thereof, in particular when the seal (305) is in said second position.

According to another non-limiting aspect, said filling element (400) and/or said pin (402) is configured for translating, in particular axially, between said first position and said second position.

According to another non-limiting aspect, the filling element (400) comprises a filling pipe (401) configured in use for supplying said gas and/or said fluid solution, in particular said mineralized solution, within said capsule for beverages (300).

According to another non-limiting aspect, said filling pipe (401) is movable, between a first position wherein it is spaced with respect to said capsule for beverages (300) and a second position wherein it is in substantial contact with said capsule for beverages (300).

According to another non-limiting aspect, said filling pipe (401) is movable, between a first position wherein it is spaced with respect to said capsule for beverages (300) and a second position wherein it is in substantial contact with said orifice (306) of said capsule for beverages (300).

According to another non-limiting aspect, the pin (402) is contained within said filling pipe (401).

According to another non-limiting aspect, said pin (402) is configured for moving with respect to the filling pipe (401), in particular for sliding, optionally axially, with respect to said filling pipe (401).

According to another non-limiting aspect, between an external surface of said pin (402) and said filling pipe (401) is defined a free surface, optionally substantially annular, destined to cause a supply of said gas and/or said fluid solution, in particular said mineralized solution, within said capsule for beverages, (300), optionally within the orifice of the capsule for beverages (300).

According to another non-limiting aspect, the machine for filling capsules comprises at least a connector configured for allowing a coupling, in particular a locking, removable of the capsule for beverages (300) in correspondence of said seat (200, 200').

According to another non-limiting aspect, said connector is configured for removably coupling with a connector of the capsule for beverages (300).

According to another non-limiting aspect, the seat (200') comprises a striking flange (204) configured for entering in substantial contact with a head portion (302) of the capsule for beverages (300).

According to another non-limiting aspect, the striking flange (204) extends in a direction substantially orthogonal to a direction of substantial development of said filling pipe (401) and/or of said pin (402).

Method for Filling Capsules

According to the present disclosure it is described a method for filling capsules, comprising:

- a step of positioning of at least a capsule for beverages (300) in correspondence of at least a seat (200, 200') configured for housing at least a capsule for beverages (300) to fill with a gas and/or with a fluid solution, in particular with a mineralized solution;
- a step of activation of an injection system (201, 400, 401, 402) configured for operatively coupling itself with said capsule for beverages (300) and for supplying in pressurized way said gas and/or said fluid solution, in particular said mineralized solution, within the capsule for beverages (300);
- wherein the step of activation of the injection system (201, 400, 401, 402) determines a pressurization of the seat (200, 200') and/or of said injection system (201, 400, 401, 402);

a step of at least partial filling of said capsule for beverages (300) through a step of supply of said gas and/or said fluid solution, in particular said mineralized solution, within the at least one capsule for beverages (300), said step of supply being determined by the step of activation of the injection system (201, 400, 401, 402).

According to the present disclosure it is also described a method for filling capsules, comprising:

a step of positioning of at least a capsule for beverages (300) in correspondence of at least a chamber (200) configured for housing at least a capsule for beverages (300) to fill with a gas and/or with a fluid solution, in particular with a mineralized solution;

a step of activation of an injection system (201, 400, 401, 402) configured for operatively coupling itself with said capsule for beverages (300) and for supplying in pressurized way said gas and/or said fluid solution, in particular said mineralized solution, within the capsule for beverages (300);

wherein the step of activation of the injection system (201, 400, 401, 402) determines a pressurization of the chamber (200) insulated from the external environment, a step of at least partial filling of said capsule for beverages (300) through a step of supply of said gas and/or said fluid solution, in particular said mineralized solution, within the at least one capsule for beverages (300), said step of supply being determined by the step of activation of the injection system (201, 400, 401, 402).

According to another non-limiting aspect, the method comprises a supply of said gas and/or said fluid solution, in particular said mineralized solution, within the capsule for beverages (300) through an orifice (306) of the capsule for beverages (300).

According to another non-limiting aspect, the step of positioning of at least a capsule for beverages (300) in correspondence of at least a seat (200, 200') comprises, optionally is, a step of positioning of said at least a capsule for beverages (300) in correspondence of a chamber (200).

According to another non-limiting aspect, said chamber is configured for being insulated from the external environment after the introduction of the least one capsule for beverages (300).

According to another non-limiting aspect, the method comprises a step of retaining of the capsule for beverages (300) in at least a predefined position in said seat (200, 200') by means of a retaining block (202); said step of retaining comprising the retaining of the capsule for beverages (300), by means of the retaining block (202), in correspondence of a predefined portion thereof, optionally in substantial correspondence of said bottom portion (301).

According to another non-limiting aspect, the retaining block (202) is elastic, and when the capsule for beverages (300) is introduced in said seat (200, 200'), said step of retaining determines a deformation of the retaining block (202), said deformation determining a retaining force on the capsule for beverages (300).

According to another non-limiting aspect, the step of activation of the injection system (201, 400, 401, 402) determines a pressurization of the chamber (200) insulated from the external environment.

According to another non-limiting aspect, the method comprises a step of closing of said chamber (200) so that said chamber (200) is insulated from the external environment.

According to another non-limiting aspect, said step of closing of said chamber (200) takes place before the step of activation of the injection system (201, 400, 401, 402).

According to another non-limiting aspect, the method comprises a step of supply in pressurized way, of said gas and/or said fluid solution, in particular said mineralized solution, within the capsule for beverages (300).

According to another non-limiting aspect, the step of activation of the injection system (201, 400, 401, 402) and/or the step of filling determines a pressurization of the chamber (200) insulated from the external environment.

According to another non-limiting aspect, the method comprises a step of closing of a cover of said chamber (200) in order to insulate it from the external environment.

According to another non-limiting aspect, the closing of the cover precedes the step of pressurization of said chamber (200) and/or precedes the step of at least partial filling of the capsule for beverages (300).

According to another non-limiting aspect, the step of closing of the cover of said chamber (200) comprises a rotation and/or a sliding of said cover from an open position to a closed position.

According to another non-limiting aspect, said step of introduction or extraction is preceded by a step of opening of said cover.

According to another non-limiting aspect, the step of opening of said cover comprises a rotation and/or a sliding of said cover from a closed position to an open position.

According to another non-limiting aspect, the method comprises a step of introduction or extraction of the capsule for beverages (300) from said seat (200, 200') wherein said injection system (201, 400, 401, 402) is not pressurized.

According to another non-limiting aspect, the method comprises a step of introduction or extraction of the capsule for beverages (300) from said seat (200, 200') wherein said chamber (200) is not pressurized and/or wherein said cover is in said open position.

According to another non-limiting aspect, the step of supply comprises a supply of at least one between said gas and/or said fluid solution, in particular said mineralized solution, in said chamber (200) through an opening for the access of gases and/or fluids (201) of said injection system (201, 400, 401, 402); said opening for the access of gases and/or fluids opening in said chamber (200).

According to another non-limiting aspect, the step of supply comprises the actuation of at least a filling element (400) of said injection system (201, 400, 401, 402), and comprises a substantial contact of said filling element (400) with a predetermined portion of the capsule for beverages (300), optionally with said head portion (302) and/or said orifice (306), said filling element (400), in said step of supply, forcing a supply of said gas and/or of fluid solution, in particular said mineralized solution, in the cavity (300*c*) of said capsule for beverages (300).

According to another non-limiting aspect, the method comprises a step of movement of the retaining block (202) between a first position and a second position;

said first position being a rest position and/or said second position being an unstable position.

According to another non-limiting aspect, the movement of said retaining block (202) between said first position and said second position is caused by a spring configured for forcing the retaining block (202) in said first position; alternatively the movement of said retaining block (202) comprising the activation of a servo-actuator configured for moving the retaining block (202) between said first and said second position.

According to another non-limiting aspect, said machine comprises a data processing unit, configured at least for controlling said servo-actuator, and the movement of the retaining block (202) between said first and said second position takes place with a control execute by said data processing unit.

According to another non-limiting aspect, the movement of said cover determines a movement of said retaining block (202) between said first and said second position.

According to another non-limiting aspect, the step of supply comprises a movement of a seal (305) of the capsule for beverages (300) between a first position within which the seal (305) closes a cavity of the capsule for beverages (300) and a second position within which the seal (305) opens the cavity of the capsule for beverages (300).

According to another non-limiting aspect, the movement of the seal (305) determines a compression of an elastic element (304) of the capsule for beverages (300).

According to another non-limiting aspect, said elastic element (304) is interposed between the bottom portion (301) and the seal (305).

According to another non-limiting aspect, the movement occurs through a contact exerted by a pin (402) of a filling element (400) of the injection system (201, 400, 401, 402).

According to another non-limiting aspect, the method comprises a movement of said filling element (400) and/or of said pin (402) between a first position wherein it is spaced with respect to said capsule for beverages (300) and a second position wherein it is in substantial contact with said capsule for beverages (300).

According to another non-limiting aspect, the method comprises a movement of said filling element (400) and/or of said pin (402) between a first position wherein it is spaced with respect to said capsule for beverages (300) and a second position wherein it is in substantial contact with an orifice (306) of the capsule for beverages (300).

According to another non-limiting aspect, the movement of said filling element (400) and/or of said pin (402) comprises a translation, in particular an axial translation, between said first position and said second position.

According to another non-limiting aspect, the step of supply comprises the supply, within the capsule for beverages (300), of said gas and/or of said fluid solution, in particular said mineralized solution, through a filling pipe (401) of said filling element (400).

According to another non-limiting aspect, the step of supply comprises a movement of the filling pipe (401) between a first position wherein it is spaced with respect to said capsule for beverages (300) and a second position wherein it is in substantial contact with said capsule for beverages (300).

According to another non-limiting aspect, the step of supply comprises a movement of the filling pipe (401) between a first position wherein it is spaced with respect to said capsule for beverages (300) and a second position wherein it is in substantial contact with the orifice (306) of said capsule for beverages (300).

According to another non-limiting aspect, the step of movement comprises a movement of the pin (402) with respect to the filling pipe (401); said movement comprising a sliding, in particular an axial sliding, of said pin (402) with respect to said filling pipe (401).

According to another non-limiting aspect, the pin (402) is contained within said filling pipe (401).

According to another non-limiting aspect, the supply of the gas and/or of the fluid solution, in particular said mineralized solution, determines a sliding of the gas and/or of the fluid solution, in particular of the mineralized solution, in a free surface, optionally substantially annular, highlighted between an external surface of said pin (402) and said filling pipe (401).

According to another non-limiting aspect, the method comprises a connection of the capsule for beverages (300) with said seat (200, 200') through a connector configured for allowing a removable coupling, in particular a removable locking, of the capsule for beverages (300).

According to another non-limiting aspect, the method comprises a removable connection of said connector with a reciprocal connector of the capsule for beverages (300).

According to another non-limiting aspect, the method comprises bringing a striking flange (204) present on said seat (200') in substantial contact with a head portion (302) of the capsule for beverages (300).

According to another non-limiting aspect, said mineralized solution comprises, or optionally is, the mineralized water produced by means of the device for water treatment according to one or more of the aspects here described and/or by means of the water treatment method according to one or more of the aspects here described.

DESCRIPTION OF FIGURES

The object of the present disclosure is now described referring to the attached figures, which are related to specific, and non-limiting, embodiments. A short description of the figures is hereinafter indicated.

FIG. 5 shows a schematic representation of a detail of an alternative embodiment of a capsule for beverages according to the present disclosure.

FIG. 6 shows a schematic representation of an embodiment of an element of the machine for filling capsules for beverages, wherein this element is configured for specifically entering into contact with a head portion of the capsule in order to determine a loading thereof; in FIG. 6 there is a first related position between said element and the capsule, wherein these element and capsule are substantially separated.

FIG. 7 shows the element and the portion of capsule shown in FIG. 6, but in a second related position of substantial and reciprocal contact.

FIG. 8 shows a detail of a portion of the capsule for beverages and of an alternative embodiment for said element.

FIG. 9 shows schematically an alternative embodiment of the machine for filling capsules for beverages.

FIG. 10 shows a detailed view of a first coupling variant between the machine and the capsule.

FIG. 11 shows a detailed view of a second coupling variant between the machine and the capsule.

DETAILED DESCRIPTION

Device for Water Treatment and Associated Method

This first part of the detailed description refers to a device for water treatment and associated method. The device for water treatment can be integrated in a machine for the loading of capsules for beverages that is described in its entirety in the successive portions of the detailed description. Equivalently, the water treatment method here described can be used in, in particular be a part of, a method for filling capsules for beverages that will be overall described further on in the description.

Figure 1:
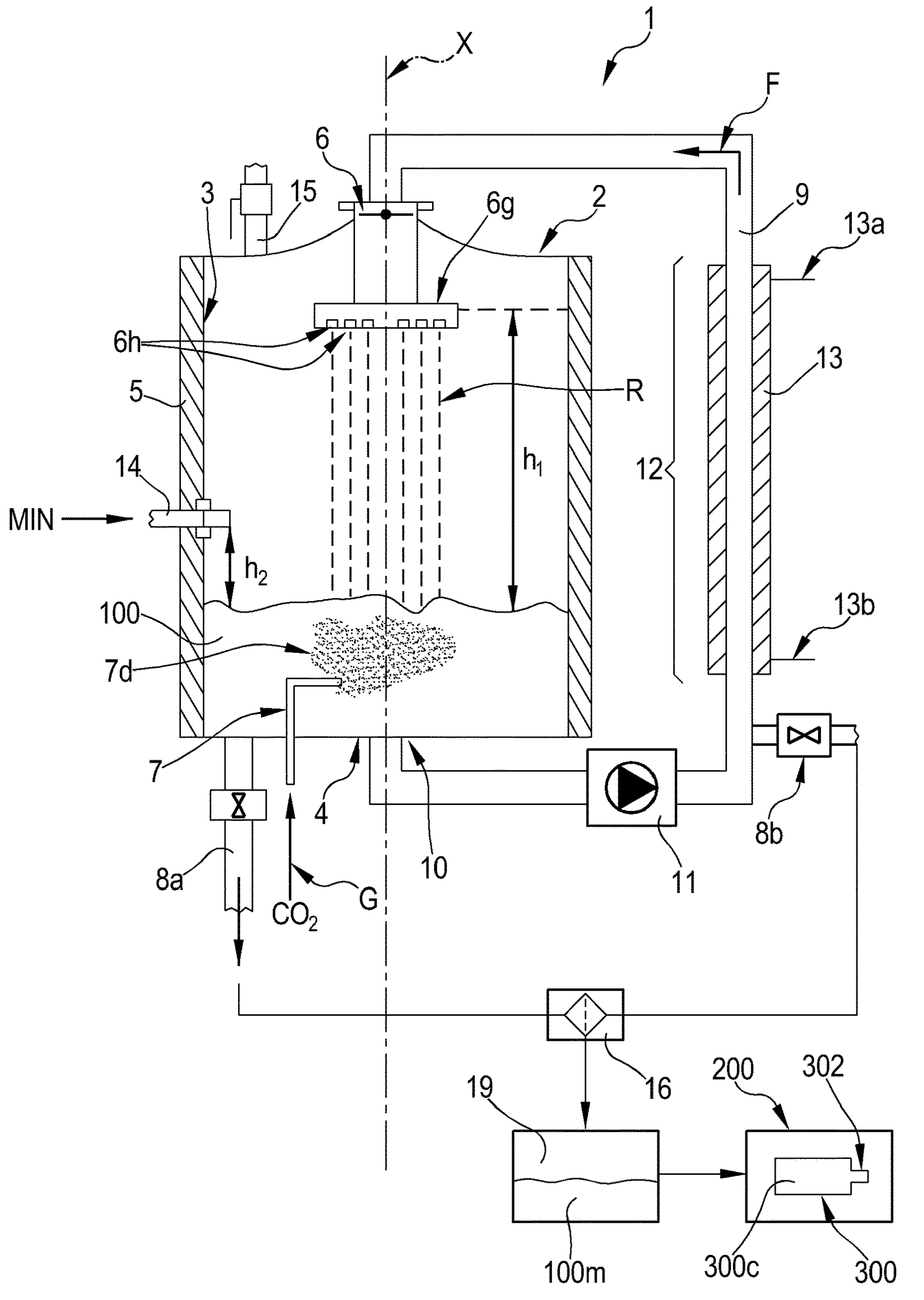
FIG. 1 shows a schematic representation of the device object of the present disclosure.

In FIG. 1, with reference number 1 is indicated in its entirety a device for water treatment.

The device 1 comprises a container 2 configured for containing, in use, a predetermined amount of water 100 to mineralize, in particular through a predefined supply of minerals. The container 2 is equipped with at least a lateral wall 3, a bottom portion 4 joined with the lateral wall 3 in correspondence of a substantially lower end portion thereof, in particular of a lower end portion thereof.

An upper wall is joined to the lateral wall 3 in substantial correspondence of a substantially upper end portion thereof, in particular of an upper end portion thereof.

Preferably, but in a non-limiting extent, the container 2 is a container realized in metallic material; the use of metallic material allows to advantageously withstand high pressures the container 2. Furthermore, the container 2 realized in metallic material is acid resistant and releases few ions or substances into the water. In an embodiment, the container 2 is realized in steel inox, which is a metallic material compatible with the treatment of water destined to human consumption. Alternatively, the container 2 can be realized in plastic material, sufficiently resistant and compatible with the treatment of water destined to human consumption.

The container 2 comprises a first opening 10 positioned in correspondence of a lower portion; the first opening 10 is destined to allow an extraction of the water 100 contained in the container 2. In a non-limiting embodiment, the first opening 10 is positioned in a bottom portion of the container 2.

The container 2 comprises a second opening 6 positioned in correspondence of an upper portion thereof; la second opening 6 is destined to allow an introduction of the water 100 in the container 2. In a non-limiting embodiment, the second opening 6 is positioned in a head portion of the container 2. An axis X of the container 2, that in use is vertically oriented, is preferably the axis that joins the first opening 10 with the second opening 6.

The device 1 comprises a gas supplying pipe 7, in particular a mineral solubilisation gas G supplying pipe. This gas supplying pipe 7 is introduced for a determined portion in the cavity of the container 2 and here shows an orifice destined to produce in use a great amount of little gas bubbles dispersing in the water 100. In FIG. 1 the little gas bubbles are identified by the reference 7*d*. In a non-limiting embodiment the gas supplying pipe 7 passes through the bottom portion 4 and protrudes upwards from the latter. The device 1 is configured for keeping, in use, the orifice of the gas supplying pipe 7 below the height assumed by the water 100. In use, a step of partial filling of the cavity of the container 2 is such that the water 100 is introduced into the container by an amount sufficient to determine a submersion of the mineral solubilisation gas G supplying pipe. In such a way, an optimal water gasification can be achieved.

In a non-limiting embodiment, the gas supplying pipe 7 can be equipped with a gas filter, configured for allowing a final filtration of the gas before the introduction into the container 2.

The device 1 comprises also at least a supply input 14 of a mineralizing substance S to solubilize in water 100. The supply input 14, in a non-limiting embodiment, is positioned in correspondence of the lateral wall 3; alternatively, the supply input 14 can be positioned in correspondence of the head wall. Preferably, in use a height h2 separates the supply input 14 (placed at a higher height) with respect to the water 100 (placed at a lower height). The supply input 14 is specifically designed to allow the introduction of a mineralizing substance S that, reacting with the mineral solubilization gas G present in water 100, determines the mineralization of water 100 itself with a solubilized compound. A positioning of the supply pipe 14 above the height at which the water 100 is located allows to introduce the mineralizing substance S at a later time than the introduction of the water 100 to solubilize.

The device 1 further comprises a suction pipe 15, that preferably—but in a non-limiting extent—is positioned in correspondence of the head wall of the container 2 or, anyway, at a height higher with respect to the height in use assumed by the water 100. In an embodiment, that is in particular the one shown in FIG. 1, the suction pipe 15 is provided with a control valve that can be completely closed for example through an operating lever or through a servo-actuator.

In correspondence of the bottom portion 4, the container 2 shows an emptying pipe 8*a*, provided with the purpose to extract at least part of the water 100 that in use is contained in the container 2. In a non-limiting embodiment, the emptying pipe 8*a* is provided with a control valve that can be actuated through an operating lever or through a servo-actuator.

To the second opening 6 is connected a dispenser 6*g*, 6*h* configured for causing, in use, a flow of water 100, in particular a rain and/or a nebulization (indicated with letter R in FIG. 1) of water 100 in a portion of said container 2 saturated with the mineral solubilization gas G. This portion is a portion free from water 100, because—as it can be seen in FIG. 1—it is positioned over the level of water 100. For realizing the rain or the nebulization, the dispenser 6*g*, 6*h* comprises a head 6*g* provided with a plurality of holes 6*h* the geometric construction, cross section and arrangement thereof are specifically conceived with the purpose of nebulizing a rain and/or nebulization on an area as wide as possible. The head 6*g* is at a height h1 with respect to the surface of the water 100. The higher is the height h1 the better is the gasification effect, then the gas dissolution in the water 100. Therefore, a vertically elongated shape for the container 2 can be advantageous.

The connection between the connection between the opening 6 and the dispenser 6*g*, 6*h* is substantially water tight and gas pressure tight, in order to allow the pressurization of container 2.

In a non-limiting embodiment, the dispenser 6*g*, 6*h* has a substantially discoidal shape and is preferably configured for causing a rain and/or a nebulization of water 100 in a direction preferably substantially axial substantially parallel to axis X. This is the form shown in FIG. 1.

In an alternative embodiment, the dispenser 6*g*, 6*h* has a substantially spheroidal shape. The dispenser 6*g*, 6*h* through said substantially spheroidal shape or through other shapes, can be configured for directing a water deliver along a plurality of directions, in particular a rain spray or a nebulization also upwards or toward the lateral wall 3.

As it is possible to observe from FIG. 1, the dispenser 6*g*, 6*h* substantially protrudes within container 2.

The device 1 object of the present disclosure also comprises a water recirculation system 9, 11, in turn comprising a pipe 9 and a pump 11. The pipe 9 is connected between the first opening 10 and the second opening 6, and at least in an operating configuration that will be better described hereinafter, allows to realize a closed water recirculation circuit within the container 2. This closed recirculation circuit is clearly insulated from the external environment. Although this has not to be understood in a limiting way, in an embodiment the pipe 9 is realized in metallic material, optionally in steel and preferably in stainless steel.

The pump 11 is positioned in correspondence of a predetermined position of the pipe 9, and is configured for forcing a water recirculation within the pipe 9, in particular forcing a flow of water 100 starting from the first opening 10 toward the second opening 6.

The pump 11 can assume any shape and be of any type; for example, and not limited thereto, this pump 11 can be an impeller or lobes rotating pump. The pump 11 is preferably an electrically actuated pump.

Optionally an auxiliary emptying pipe 8*b*, provided with the purpose of extracting at least part of the water 100 that in use is contained in the container 2, can be installed in correspondence of pipe 9; preferably the auxiliary emptying pipe 8*b* is connected downstream of the pump 11. In a non-limiting embodiment, the auxiliary emptying pipe 8*b* is provided with a control valve that can be actuated through an operating lever or through a servo-actuator. The auxiliary emptying pipe 8*b* can be present as an alternative to the main emptying pipe 8*a*.

In a preferred and non-limiting embodiment, the device 1 also comprises at least a cooling and/or thermal insulating device 12, 13*a*, 13*b* arranged in correspondence of at least one between the water recirculation system 9, 11 or said container 2 and destined to determine a cooling of the container 2 and/or of the water 100 in use contained in the container 2 at a temperature T1 optimal for the absorption of said mineralization gas G and/or destined to keep said cooling of the container 2 and/or of water 100 in use contained in the container 2. The cooling and/or thermal insulating device 12, 13*a*, 13*b* comprises an active cooler 13, 13*a*, 13*b*, positioned preferably in correspondence of pipe 9, or alternatively in at least one between the lateral wall 3 and the bottom portion 4 of container 2. The active cooler 13*a*, 13*b* can be for example a thermo-electric cooler or can be a hydraulic cooler and/or a gas.

The cooling and/or thermal insulating device 12, 13*a*, 13*b* also comprises a thermal insulation sleeve 12 that wraps at least part of the pipe 9. The cooling and/or thermal insulating device 12, 13*a*, 13*b* also comprises an insulating layer 5 positioned at least in correspondence of the lateral wall 3 of the container 2. In a non-limiting embodiment, the insulating layer is arranged outside of the external face of the lateral wall 3; the insulating layer 5 does not enter into contact with water 100.

The device 1 further comprises a temperature sensor configured for detecting the temperature of the water 100 present in the container 2 or that slides within the pipe 9. In a non-limiting embodiment, the temperature sensor is substantially installed in correspondence of the pipe 9, downstream of the pump 11. The temperature sensor is not described here in detail because it can be of any known technology; preferably the temperature sensor is connected with a data processing unit for allowing to adjust the intervention of the active cooler 13*a*, 13*b* in order to keep an appropriate temperature for the water 100 in such a way to have, in use, an optimal level of solubilization of the mineralizing compound.

FIG. 1 shows also a filtering system 16, that is operatively connected with the emptying pipe 8*a*, and where present, with the auxiliary emptying pipe 8*b*. This filtering system 16 comprises a filter configured for retaining substantially solid residuals from the mineralized water 100 that is extracted from the container 2; in particular this filter is configured for retaining residuals not properly solubilized in water. In a preferred, but non-limiting embodiment, the filter is a paper filter; preferably, but not limited thereto, the filtering system 16 comprises two (or more) filters positioned in cascade. In this case, opportunely, the upstream filter will have a retention capacity lower (wider holes) with respect to the downstream filter (narrower holes).

The device 1 first of all comprises an operating configuration of mineralization, wherein the container 2 is pressurized through the gas G supplied through the gas supplying pipe 7, in order to be at first brought, and hereinafter kept, at a pressure at least equal to a predefined pressure value P1 higher than the environmental pressure (atmospheric pressure of the place where the device 1 lies). In this operating configuration, the mineralizing substance S chemically reacts in the water 100 with the gas G determining the production of a mineralizing compound of the water that is solubilized. In the operating configuration of mineralization, as it is easily understandable from the previous paragraph, and in order to bring the pressure of the container 1 to the predefined pressure value P1 higher with respect to the environmental pressure, the container 2 is positioned in a condition of substantial insulation from the external environment.

The device 1 further comprises an operating configuration of gas removal, wherein the container 2 is positioned at a pressure lower than the environmental pressure, determining a gas removal from the water 100. The air present in the container 2 is extracted through the suction pipe 15. It is observed that the operating configuration of gas removal is not necessarily present in order to ensure the functioning of the device 1. However, the actuation of said operating configuration of gas removal is useful (and preferrable) to promote a maximal dissolution of the gas G in the water.

The device 1 has been in particular conceived for allowing the solubilization of Ca in water under the form of calcium bicarbonate ($Ca(HCO_3)_2$). The gas G is, preferably, carbon dioxide ($CO_2$). The mineralizing substance S is, preferably, calcium carbonate ($CaCO_3$).

The gas G derives from a pressurized source, for example—but in a non-limiting extent—a bottle. Alternatively, the gas supplying pipe can be supplied by a chemical reactor conceived for the production of carbon dioxide, as main or secondary product. This reactor is not described here because of known type.

In use, during the operating configuration of mineralization, it is determined a water acidification by effect of the presence of carbon dioxide, so:

$$CO_2 + H_2O = H_2CO_3$$

$H_2CO_3$ is carbonic acid.

Thanks to the presence of calcium carbonate ($CaCO_3$), in the operating configuration of mineralization it is determined a chemical reaction with the carbonic acid ($H_2CO_3$)

that causes the production of calcium bicarbonate ($Ca(HCO_3)_2$) that is soluble in water.

A similar chemical process is realizable through the device object of the present disclosure using magnesium carbonates, in particular magnesium bicarbonate ($Mg(HCO_3)_2$) that is produced by the following reaction starting from the milk of magnesia (or magnesium hydroxide, $Mg(OH)_2$):

$$Mg(OH)_2 + CO_2 = Mg(HCO_3)_2$$

In a specific and non-limiting embodiment, the device 1 comprises a storage tank 19, operatively connected to the emptying pipe 8*a* and/or, if present, to the auxiliary emptying pipe 8*b*; in particular, the storage tank 19 is operatively connected to said pipes but is positioned downwards of the filtering system. In a preferred and non-limiting embodiment, the device 1 comprises a heating element, configured for heating the water 100 in use contained in the storage tank 19 at a temperature T2, that is preferably comprised in the range [20-60]° C., more preferably in the range [30-50]° C., or that, alternatively is comprised in the range [10-30]° C.; after the transfer in the storage tank 19, the water 100 undergoes a heating (from T1 to T2) by effect thereof the eventual carbonic acid ($H_2CO_3$) still present in the water is dissociated, and the calcium bicarbonate ($Ca(HCO_3)_2$) stabilizes.

Optionally, but preferably, a manometer can be positioned on the body of container 2 in a configuration such as to detect the pressure assumed therein.

Furthermore, always optionally, but preferably a level indicator and/or sensor can be present for allowing to verify the level assumed by the water 100 inside the container 2. The level indicator and/or sensor can be of electronic type and/or transparency type.

Figure 2:
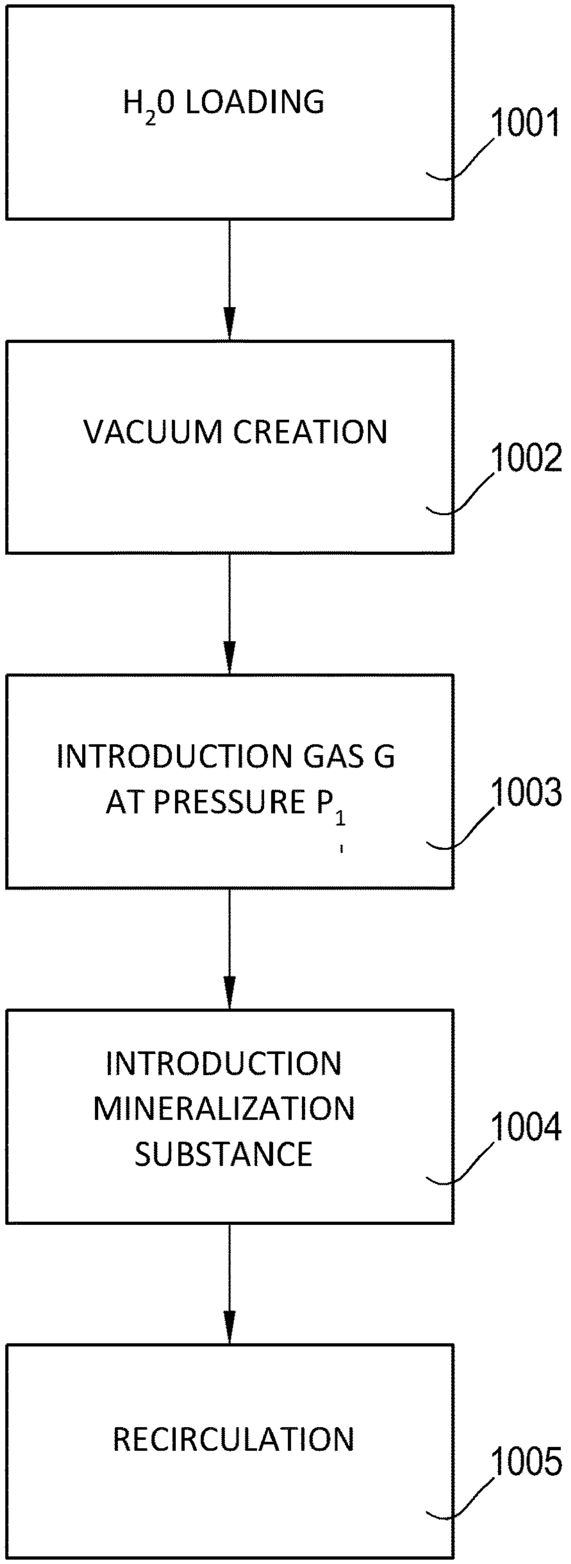
FIG. 2 shows a block diagram of a water treatment method according to the present disclosure.

In FIG. 2 is shown a block diagram that shows some steps of a process of water treatment according to the here disclosed method. This method, that is carried out with the aid of the device 1 here described, comprises:

- the introduction of a predetermined amount of water 100 to mineralize in the container 2;
- an introduction, in the water 100 contained in the container 2, through the gas supplying pipe 7, of a gas G destined to allow a solubilisation of the mineralizing substance S in water;
- the introduction of the mineralizing substance S in the water 100, the introduction taking place through the supply input 14 arranged on the container 2;
- a step of pressurization of container 2 through the gas G supplied within the container 2, bringing and/or keeping the container 2 at a pressure at least equal to a predefined pressure value P1, higher with respect to the environmental pressure,
- a mineralization of the water 100, determined by a chemical reaction between the gas G and the mineralizing substance S, wherein the mineralization of water 100 determines the production of mineralized water with a solubilized compound deriving from said chemical reaction between the gas G and the mineralizing substance S.

In the step of pressurization, the container 2 is clearly kept substantially insulated from the external environment.

More in detail, the block 1001 identifies the step of loading of water 100 in the container 2; the loading can occur in manual way or in automated way. The step of loading of the water is such as to leave a free height between the dispenser 6*g*, 6*h* and the water 100 itself; furthermore, the step of loading of the water is such as to submerge the G gas supply pipe.

The block 1002 identifies a step of vacuum creation (optional) in the container 2; through the suction pipe 15 a vacuum pump sucks the air from the portion of container 2 not filled with water 100, and also removes, at least partially, the gases contained within the water 100. This promotes a higher subsequent saturation with gas G (in the above-described embodiment, carbon dioxide). In an embodiment, the vacuum pump is not part of the device 1 here described. In an alternative embodiment, the vacuum pump is part of the device 1 here described.

The vacuum is kept for a predetermined time t1, for example and in a non-limiting extent equal to 1 minute, or 2 minutes or 3 minutes; after said predetermined time t1 can be present a subsequent and secondary step of aspiration of air through the suction pipe 15.

The block 1003 shows a step of supply of gas G within the container 2. Preferably, but in a non-limiting extent, the step of supply of gas G within the container 2 occurs without restoring the environmental pressure with normal air. From the vacuum, therefore, carbon dioxide ($CO_2$) is progressively introduced into the container 2 until it reaches the predetermined pressure value P1.

Preferably, but in a non-limiting extent, P1 is at least equal to 1.5 bar, or at least equal to 2 bar, or at least equal to 3 bar. The Applicant observes that keeping a high pressure in the container 2 promotes the absorption of carbon dioxide ($CO_2$) in the water 100. Therefore, keeping the container 2 at a pressure P1 higher with respect to the environmental pressure will promote the solubilization of calcium bicarbonate ($Ca(HCO_3)_2$).

The block 1004 identifies a step of introduction to the mineralizing substance S, that is for example—as above described—calcium carbonate ($CaCO_3$). The introduction of the mineralizing substance S occurs through the supply input 14 of the mineralizing substance S.

The adjustment of the related amounts of water 100, of calcium carbonate ($CaCO_3$) and of carbon dioxide ($CO_2$) can be carried out manually or through a substantially automated control. Block 1005 identifies the step of recirculation of the water 100 contained inside the container 2; the water, that at this point starts to be saturated with $CO_2$ is sucked from the first opening 10, enters inside the pipe 9, passes through the pump 11 and subsequently is pushed towards the second opening 6 which is at a height h1 with respect to the surface of water 100 still contained in the container and falls again downwards transiting through a height h1, in an environment under pressure and saturated with carbon dioxide. The rain generated through the holes 6*h* of the dispenser 6*g*, due to gravity force, moves along a direction substantially parallel to the direction detected by the axis X, that is in use vertically oriented and that represents the axis of the container 2.

It is observed that the step of recirculation identified by the block 1005 does not take place necessarily only at the end of the step of introduction of the mineralizing substance S; in fact, in an alternative embodiment, the step of recirculation can occur also after, or even before and during, the introduction of the mineralizing substance S.

The method object of the present disclosure comprises also a step of cooling and/or thermal heating of at least one between the container 2 and/or the water here contained. This step provides, further or alternatively to the passive thermal insulation produced through the sleeve 12 or the insulating layer 5, a step of active cooling realized through the active cooler 13*a*, 13*b* on the water that slides in the pipe 9. The temperature T1 is preferably comprised in the range [0-10]° C., more preferably comprised in the range [3-7]° C., and ideally is substantially equal to 5° C. The keeping of this temperature advantageously allows, all other conditions being equal, a greater solubilization of calcium bicarbonate ($Ca(HCO_3)_2$) in water. The method provides for an adjustment of the intervention of the active cooler 13*a*, 13*b* through a data processing unit which receives a temperature signal from the temperature sensor. It is observed that the pressurized G gas supply provides to the assembly a minimal amount of thermal energy which partially intervenes to support the endothermic dissolution process of the calcium bicarbonate ($Ca(HCO_3)_2$) in water, allowing to reduce the time needed to obtain water 100 properly provided with the appropriately solubilized mineralizing compound.

At the end of the method here described (end of the mineralization step), the water 100 can be extracted from the container 2 through the emptying pipe 8*a*, and/or through the auxiliary emptying pipe 8*b*; the water 100 results mineralized but comes out "natural" and not "gasified" as traditional drinking waters.

It is observed that optionally, the method described here can comprise a further step of treatment of water 100 extracted from container 2, which takes place at the end of the mineralization step described above.

The water 100 collected from container 2, and filtered through the filtering system 16, can advantageously be transferred into a storage tank 19; in this storage tank 19 it is preferably heated at an appropriate temperature T2, which is preferably comprised in the range [20-60]° C., more preferably in the range [30-50]° C., or that, alternatively is comprised in the range [10-30]° C.; substantially then, after the transfer in the storage tank 19, the water 100 undergoes a heating (from T1 to T2) by effect thereof the eventual carbonic acid ($H_2CO_3$) still present in the water dissociates, and the calcium bicarbonate ($Ca(HCO_3)_2$) stabilizes.

As briefly previously mentioned, the device 1 can be equipped with a data processing unit that oversees its operation, and in particular allows to switch between the operating configuration of gas removal and the operating configuration of mineralization, and optionally, allows to adjust the opening and closing of the various inlet and outlet pipes above described, so that it is possible to realize a functioning as much as possible automated of the water mineralization process above described.

The data processing unit can comprise a processor of general-purpose type, or can comprise one or more processors or dedicated integrated circuits (ASIC) or can comprise a FPGA or a PLC controller. A software program, written in any programming language, can be stored in a memory made operatively accessible by the data processing unit, e.g. contained therein, and comprises portions of software code that, when executed, cause the execution of the steps of the above-described method.

In particular the data processing unit can be operatively connected with at least one, preferably all, the solenoid valves positioned respectively on the gas supplying pipe 7, on the supply input 14 of the mineralizing substance S, on the suction pipe 15, on the emptying pipe 8*a* and, optionally, on the auxiliary emptying pipe 8*b*, and/or can be operatively connected with the pump 11 and with the active cooler 13*a*, 13*b*.

The mineralized water 100*m* contained within the storage tank 19 can thus be used for specific applications of a sanitary or human consumption type. In a non-limiting embodiment, the mineralized water 100*m* contained within the storage tank 19 can be used to realize water mineralization capsules containing a highly mineralized liquid solution to distribute (in particular uniformly diluted) in at least one water bottle and/or destined to sanitary applications.

Machine for filling a capsule for beverages and associated capsule for beverages.

Figure 3:
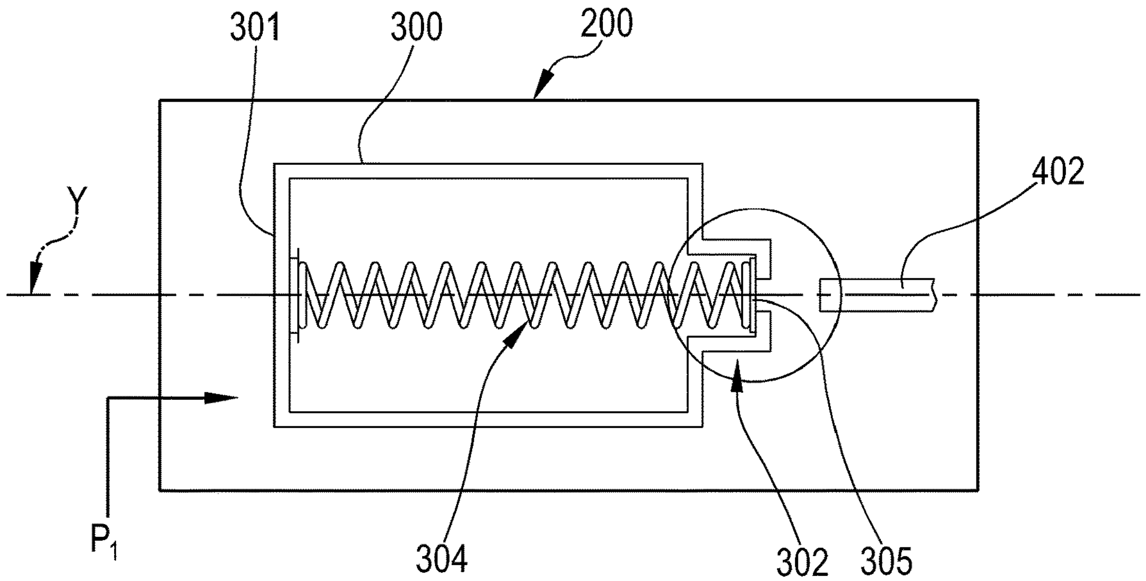
FIG. 3 shows a schematic representation of a non-limiting embodiment of a part of a machine for filling capsules for beverages, wherein it is present a chamber destined to contain a capsule for beverages to be filled.
Figure 4:
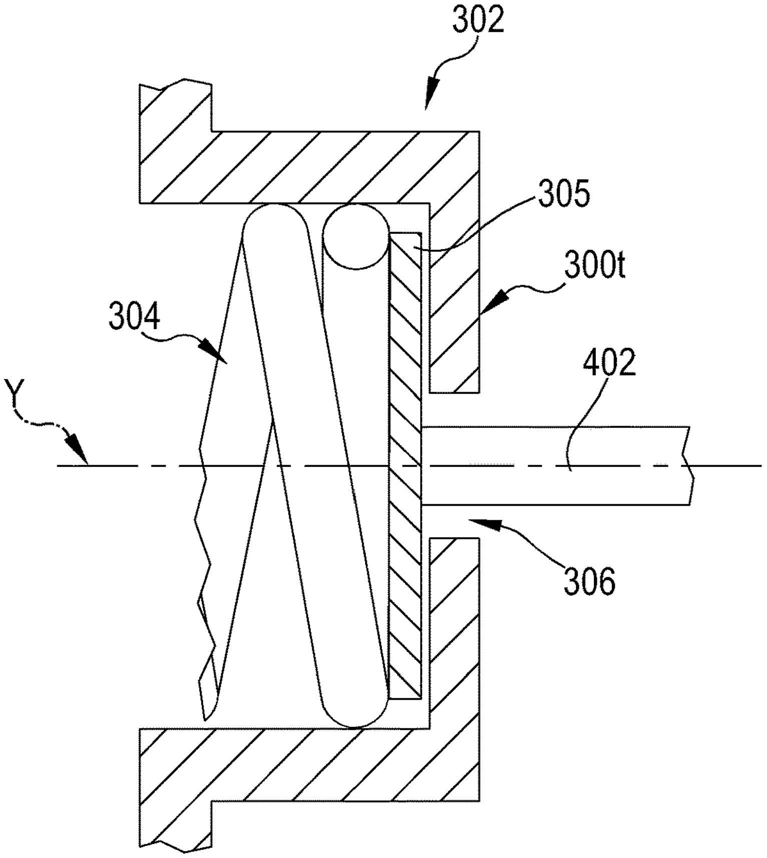
FIG. 4 shows a schematic representation of a detail of an embodiment of a capsule for beverages according to the present disclosure.

FIGS. 3 and 4 show respectively and schematically a machine for filling capsules for beverages and a detail of an inner portion of a capsule for beverages. In the following portion of description it is illustrated a machine for filling capsules and a capsule for beverages which is filled with part of the mineralized water 100*m* contained within the storage tank 19.

The mineralized water 100*m* that exits from container 2, and thus when present from the storage tank, after the step of mineralization is described here as "mineralized solution".

Before proceeding with the detailed description of the various embodiments of the machine for filling capsules, a description of some of the embodiments of the capsules for beverages 300, which are in particular conceived to be filled with a mineralized solution produced through the above-described device, is provided.

Although reference is made in the present disclosure to a machine conceived with the purpose of filling one capsule for beverages 300 at a time, it is understood that this solution is not to be understood in a limiting manner; in fact, in an embodiment, the machine described herein can be configured for operating with more capsules for beverages 300, and in particular can be configured for operating a simultaneous loading of at least part of a plurality of capsules for beverages 300.

The capsule for beverages 300 comprises a body provided with a head portion 300*t* and a lateral wall that comprises a bottom portion 301 opposed with respect to the head portion 302. The head portion 302 has a head wall 300*t* which is parallel to the wall of the bottom portion. Clearly this geometric conformation is not to be understood as limiting.

The head portion 302 preferably is tapered with respect to the remaining portion of the body of the capsule for beverages 300; this means that the capsule for beverages 300 has a first portion having a first (and greater) cross section and a second portion, in particular the head portion 302, having a second (and smaller) cross section. In an embodiment, the body of the capsule is cylindrical and therefore the aforementioned cross sections can be identified through a respective diameter. In particular, then, the cavity 300*c* of the capsule for beverages comprises a first portion having a first cross section, and this first portion can be understood as the central or main portion. The cavity 300*c* in correspondence of the head portion 302 assumes a second cross section: the latter is of lower value than the cross section of the first portion.

In a non-limiting embodiment, the capsule for beverages 300 is assembled and can be operatively disjoined into two distinct portions. A specific embodiment provides for the demountable bottom portion 301, in particular unscrewable, with respect to the rest of the body of the capsule.

The capsule for beverages 300 can be realized in any material, in particular in any material compatible with food applications or for sanitary purposes. In an embodiment, this material is a metallic material, e.g. aluminium, steel or brass. This also makes the capsule reusable. In a non-limiting embodiment, the capsule for beverages 300 object of the present disclosure is realized in a material resistant to carbon dioxide, in particular a material configured for not chemically reacting with the carbon dioxide present in use in the cavity 300*c*, in order not to affect its content.

The capsule for beverages 300 comprises an orifice 306 that allows the passage of gas and/or fluids, in particular of the mineralized solution, from the inner cavity 300*c* of the capsule for beverages 300, outside of the capsule for beverages 300 and vice versa. In a preferred and non-limiting embodiment, the orifice 306 is positioned in substantial correspondence of the head portion 302, ed in particular in correspondence of the head wall 300*t*. In the embodiment shown in the attached figures, the orifice 306 has an its own axis that is substantially parallel to the direction of maximum extension of the capsule for beverages 300, and in particular is substantially coincident with the direction of maximum extension of the capsule for beverages 300. Preferably, the orifice 306 has a cross section (orthogonal with respect to its axis) of substantially circular shape.

Inside the cavity 300*c* there is a seal 305, movable at least between a first position suitable for determining a closure of the orifice 306 and a second position suitable for determining the opening of the orifice 306 and thus of the capsule for beverages 300; in an embodiment the movable seal 305 is movable in an axial direction. In particular, in FIG. 4 it can be observed a seal 305 axially movable between a first and a second position along the axis Y of the capsule for beverages 300. The cross section, or area, of the seal 305 is greater with respect to the cross section, or area, of the orifice 306. The cross section, or area, of the seal 305 is preferably smaller, or otherwise substantially equal, with respect to the cross section of the portion of the cavity in correspondence of the head portion 302.

The attached figures show embodiments wherein the seal 305 assumes a substantially discoidal or otherwise planar shape. However, this shape is not to be understood as limiting; in an alternative embodiment the seal 305 assumes the shape of an anti-flooding valve with multiple and movable elements.

In FIG. 5 it can be observed an alternative embodiment of the capsule for beverages 300 which is characterized by a seal 305, which is at least partially movable by rotation between a first position suitable for determining a closing of the orifice 306 and a second position suitable for determining the opening of the orifice 306 and thus of the capsule for beverages 300. The rotation may take place along an axis 307 substantially inclined, preferably orthogonal, with respect to the axis Y.

In a not shown embodiment, the seal 305 is configured for moving with a composite roto-translational movement that takes place between the first position and the second position.

Preferably, as shown in FIGS. 3, 4 and 5, the seal 305 is positioned in substantial correspondence of the head portion 302, and in particular when in correspondence of the first position, is arranged substantially in contact with an inner face of the head wall 300*t*. This inner face of the head wall realizes a striking wall for the seal 305.

The capsule for beverages 300 is configured for keeping, in rest conditions, the seal 305 in said first position; equivalently, the capsule for beverages 300 is configured for keeping, in rest conditions, the orifice 306 in closed configuration. In this way, the pressure contained within the cavity 300*c* is favorably kept. The seal 305 is moved from its resting condition only by effect of an external force which causes a switch of operating configuration for the capsule for beverages 300, in particular between a closed or sealed operating configuration wherein the cavity 300*c* is insulated and an open operating configuration wherein the cavity 300*c* is accessible from the outside of the capsule for beverages 300.

When the seal 305 is moved from the first position toward the second position, the pressurization within the cavity 300*c* can be released; where the pressure of the external environment is greater with respect to the one of the cavity 300*c*, the movement of the seal 305 from the first position towards the second position determines the possibility of pressure increase for the cavity 300*c*.

In use the capsule for beverages 300 contains preferably a mineralizing solution mixed with a gas, e.g. carbon dioxide, and when the seal 305 is moved from the first position, the presence of said gas conveniently allows a substantially total extraction of the mineralizing solution here contained.

The seal 305 can be moved between the first and the second position a plurality of times, without breaking. Thanks to this aspect, it is possible to proceed to an extraction of the content of the capsule for beverages 300 in subsequent time instants.

For this purpose, an elastic element 304, for example and in a non-limiting extent, in the shape of a spring (e.g. an helical spring), is arranged within the capsule for beverages 300 in order to allow the exertion of a force which determines, in said rest conditions, the maintenance of the seal 305 in said first position. FIGS. 3, 4, 5 show said elastic element 304 in the shape of a helical spring; however, this is not to be understood in a limiting manner, as an equivalent and different type of elastic element could be suitably provided within the capsule to perform the same function.

In the embodiment shown in FIG. 3, the elastic element 304 is interposed between the bottom portion 301 and the seal 305; in a specific embodiment, the elastic element 304 extends substantially axially along the axis Y of the capsule for beverages 300. When the capsule is in the closed operating configuration, the elastic element 304 assumes a maximum extension or, equivalently, assumes a minimum compression.

In an alternative, not shown, embodiment, the elastic element 304 can be partially integrated in the seal 305.

Preferably, but in a non-limiting extent, the seal 305 is a flexible seal, and in a specific embodiment is realized in polymeric material, in particular silicone. Specifically, such silicone is destined for applications compatible with human consumption. The use of a flexible seal allows it to adapt to micro asperities that may be found in correspondence of the striking wall, determining an optimal closing of it. In particular, the seal 305 can assume a substantially shaped disc in silicone.

When the capsule for beverages 300 is operatively demountable, the seal 305 and/or the elastic element 304 can be replaced. This contributes to allow the creation of a reusable capsule for beverages.

In a non-limiting embodiment, the capsule for beverages 300 comprises a connector engageable on a predetermined portion of a machine for filling capsules; the connector, which for example and non-limiting thereto can be either a bayonet connector or a screwable connector, is preferably positioned in substantial correspondence of the head portion 302.

Preferably, but in a non-limiting extent, the capsule for beverages 300, and in particular the seal 305, are configured to support, in use, a pressure higher with respect to the operating pressure that is typical of the previously described device; in a preferred, but non-limiting embodiment, the capsule for beverages 300 and in particular the seal 305 are configured for supporting, in use, a pressure at least equal to 4 bar. If this is not possible, it is still preferable, for safety reasons, that the capsule for beverages 300 and the seal 305 are configured to withstand at least a pressure of 2 bar or 3 bar.

The machine for filling capsules here described comprises an injection system 201, 400, 401, 402 configured for operatively coupling with said capsules for beverages 300 and for supplying in pressurized manner, in use, a gas and/or a fluid solution, in particular said mineralized solution, into the capsule for beverages 300.

The machine described here comprises a seat 200, 200' configured for housing at least one capsule for beverages 300 to fill with a gas and/or with a fluid solution, in particular with a mineralized solution.

In FIG. 3 is shown a machine for filling capsules wherein the seat assumes a substantially closed or closable shape and is hereinafter described as chamber 200.

The machine for filling capsules, in a first embodiment shown in FIG. 3 comprises a chamber 200 within which, in use, is introduced at least a capsule for beverages 300.

The chamber 200 shows at least an open configuration and a closed configuration; in the open configuration, the chamber is configured for allowing the entry of the capsule for beverages 300; in the closed configuration, the cavity 300*c* is sealed and is ready to be brought to a pressure greater with respect to the environmental pressure. When the machine is configured for operating with more capsules for beverages 300, this machine will be provided with a chamber 200 capable of containing a plurality of said capsules for beverages 300, or will be provided with more chambers 200 capable of containing, each, at least one capsule for beverages 300.

The chamber 200 comprises at least an openable and closable cover; in a closed configuration, the chamber 200 is insulated from the external environment. In a non-limiting embodiment, the cover is configured for rotating between an open position and a closed position, whereas in another embodiment the cover is configured for translating between the open position and the closed position. In a further embodiment, the cover is configured for performing a complex roto-translational movement.

An opening for the access of gases and/or fluids 201, part of the injection system 201, 400, 401, 402, is present in correspondence of the chamber 200 for allowing its pressurization or depressurization. A gas and/or fluid (in particular the mineralized solution) are supplied within the chamber 200 when the cover is closed, determining, in use, a pressurization thereof.

Within the chamber 200 there is a pin 402, also part of the injection system 201, 400, 401, 402; the pin 402 is movable at least between a first position and a second position; in the first position the pin 402 is spaced from the capsule for beverages 300; in the second position the pin 402 is partially introduced within the capsule for beverages 300, in particular resulting introduced within an orifice 306 present in substantial correspondence of the head portion of the capsule for beverages 300. Therefore during a process of loading of the capsule for beverages 300 there is a step of movement of pin 402 between the first position and the second position.

In a preferred but non-limiting embodiment, the pin 402 is axially oriented on the Y axis of the orifice 306 and in use translates along this axis. The cross section S1 of the pin is smaller than the cross section of the orifice 306. Thus, when the pin is introduced into the orifice 306 (second position) a free area is present between the pin and the walls of the orifice. This free area allows the passage of the mineralized solution or of a gas (e.g. carbon dioxide or air) into the capsule for beverages 300. Thus in a non-limiting embodiment, the step of movement of the pin 402 is a step of translation, in particular of axial translation.

A retaining block 202 is present within the chamber 200 for retaining the capsule for beverages 300 in an appropriate and predetermined position that allows the introduction of the pin into the orifice 306. In a preferred but non-limiting embodiment, the striker 202 is positioned in substantial correspondence of the rear portion of the capsule for beverages 300. The striker 202 can be present also within the chamber 200 and is preferably configured for geometrically coupling with a portion of the capsule for beverages 300, in particular and non-limiting thereto the bottom portion 301. Preferably, but non-limiting thereto, the striker 202 is elastic, and when the capsule for beverages 300 is coupled thereto, it keeps a slightly deformed configuration, which loses when the capsule for beverages 300 is extracted.

In an embodiment this retaining block 202 can be configured for retaining at least part of the body of the capsule in correspondence of the bottom portion 301 and of a portion of lateral surface next to the bottom portion 301.

Preferably, although in a non-limiting extent, the retaining block 202 can be movable between a first rest position and a second unstable position, the latter being kept when the capsule for beverages 300 is introduced into the seat. A spring, not shown in the attached figures, can be used to force the striker 202 into the first rest position. Alternatively to the spring, a servo-actuator, for example controlled by a data processing unit of the machine described herein, can be equivalently used to move the striker 202 between said first and said second position. In the latter case, the first rest position and the second position may not be unstable.

In another embodiment, the movement of the cover determines a movement of the retaining block 202 in the following manner: when the cover is open the retaining block 202 is in the second position and the capsule for beverages 300 can be easily introduced in the seat, in particular in the chamber 200. When the cover is closed the retaining block 202 is in the first position and the capsule for beverages 300 is blocked in a predetermined position that aids the operation of the pin 402. It is observed that the mobility of the retaining block 202 is a technical characteristic that can be present even if the seat 200, 200' assumes the shape of a substantially open seat.

In use, the pin 402, through its movement from the first to the second position, determines an opening of the orifice 306 forcing, by contact, a movement of the seal 305 between the first position and the second position. The pressurized gas present within the chamber 200 enters the capsule for beverages 300. The thrust exerted by the pin 402 determines a translation and/or a rotation of the seal 305; the elastic element 304 is progressively compressed.

The machine for filling capsules is also configured for allowing to introduce the mineralized solution into the capsule for beverages 300 while keeping it under pressure thanks to the presence of the pressurized gas present within the chamber 200.

In an embodiment, the chamber 200 is partially filled with said mineralized solution and upon the movement of the seal 305 from the second position to the first position through the pin, this mineralized solution enters the capsule for beverages 300 through the orifice 306 together with part of the gas.

The Applicant has conceived another embodiment, wherein the chamber 200 is not provided with the pin. In this case, the pressure in use developed inside the chamber 200 itself is sufficient to determine a movement of the seal 305 from the first to the second position to determine a supply of the mineralized solution and/or of the gas inside the capsule, determining an at least partial filling.

In an operating configuration of filling of the at least one capsule for beverages 300, the chamber 200 is pressurized; in an operating configuration of introduction and/or extraction of the at least one capsule for beverages 300, the chamber 200 is not pressurized.

In an alternative embodiment, the filling element 400 assumes a shape of an injector that comprises:

an injection or filling pipe 401 for gas and/or mineralizing solution inside the capsule for beverages 300;

a pin 402 for the movement of the seal 305, in particular configured for allowing to move the seal 305 from the first position to the second position.

FIG. 6 shows a preferred and non-limiting embodiment, of the filling element 400 wherein the pin 402 is positioned within the injection or filling pipe 401, and assumes a cross section lower with respect to the cross section detected by the injection or filling pipe 401. In a particular embodiment, the pin 402 assumes a diameter lower with respect to the diameter detected by the injection or filling pipe 401.

FIG. 6 shows a particular use configuration wherein the element 400 lies in a first position spaced from the capsule for beverages 300, in particular spaced from the head portion 302 of the capsule for beverages 300.

The element 400, also in this last embodiment, can be positioned in a second position wherein it is in substantial contact with the head portion 302 of the capsule for beverages 300. In the second position, in particular, and as shown in FIG. 7, injection pipe 401 is in substantial contact with the head wall 300*t* of the capsule for beverages 300; the pin 402 is moved with respect to the injection pipe 401 for penetrating within the orifice 306 enough to cause a movement of the seal 305 from the first position to the second position. This determines the presence of a free space (arrow F) between the seal 305 and the head wall 300*t* such as to determine the possibility of access for gas and/or mineralized solution.

In general it can therefore be asserted that the machine here described is configured for causing a relative movement, in particular a relative axial translation, between the capsule for beverages 300 and the element 400 at least between:

a first position wherein the element 400 is substantially separated with respect to the capsule for beverages 300, and a second position wherein the element 400 is in substantial contact with the capsule for beverages 300.

Depending on the specific embodiment, when the second position exists relatively assumed between the element 400 and the capsule for beverages 300:

the pin 402 can be in a first position suitable for allowing the keeping of the closure of the capsule for beverages 300, determining a keeping of the seal 305 in said first position;

the pin 402 can be in a second position suitable for allowing the opening of the capsule for beverages 300, determining a movement of the seal 305, that is no more in said first position, but lies—on the contrary—in said second position.

FIG. 8 shows another non-limiting embodiment, wherein the element 400 comprises an injection or filling pipe 401 and does not comprise the pin 402. The injection pipe is movable between a first position wherein it is substantially separated with respect to the capsule for beverages 300, and a second position wherein it is in substantial contact with the capsule for beverages 300. In this case, the movement of the seal 305 will be carried out exclusively by means of an action of a liquid or gas pressure exerted by the liquid or gas flowing into the injection pipe itself. Clearly, in such a case, when the injection or filling pipe 401 is in substantial contact with the capsule for beverages 300, and in particular in substantial contact with the head wall 300*t* of the capsule for beverages 300, it is important that an appropriate seal is realized between the two elements in order not to disperse a gas or liquid pressure. The cavity of the injection pipe is in substantial alignment with the orifice 306.

In a non-limiting embodiment, a contact portion of the injection or filling pipe 401 (front portion, in use in contact with the head wall 300*t*) can be realized in soft and/or yielding material, e.g. a polymeric material comprising a silicone, to realize in use an optimal contact.

In an embodiment, when the injection or filling pipe 401 is placed in contact with the capsule for beverages 300 (second position relatively assumed between them), the mineralized solution is made flow in the injection or filling pipe 401.

In another embodiment, the capsule for beverages 300 is previously filled with said mineralized solution, and in use, when the injection or filling pipe 401 is placed in contact with the capsule for beverages 300 (second position relatively assumed between them), a gas is made flow into the injection or filling pipe 401.

Another embodiment of the machine for filling capsules provides for a seat 200' of retention of capsules for beverages 300, provided with a striker 202 for the capsule for beverages 300, and a striking flange 204, that in use enters into substantial contact with the capsule for beverages 300 in correspondence of the head portion 302. In this last case, the presence of a chamber 200 in use pressurized is not necessary.

An element 400 comprising an injection or filling pipe 401 configured for allowing the introduction of gas and/or of the mineralized solution within the capsule for beverages 300 is fixed to the striking flange 204. The striking flange 204 houses in its interior at least part of the injection or filling pipe 401, and as visible in FIG. 9 for example, extends substantially on a plane orthogonal with respect to the axis Y. The striking flange 204 extends also substantially orthogonally with respect to the direction of maximum extension of the injection or filling pipe 401.

The element 400 comprising an injection or filling pipe 401 is placed in contact with the capsule for beverages 300 so that between the injection or filling pipe 401 and the capsule for beverages 300, or between the striking flange 204 and the capsule for beverages 300 a seal is maintained so as to allow the introduction of gas and/or of the mineralized solution under pressure without significant leakages.

FIG. 10 shows an embodiment wherein the seal is realized in correspondence of a neck present near the head portion 302, that has a tapered shape with respect to the remaining portion of the capsule.

A contact area A between the striking flange 204 and an undercut present in correspondence of said neck ensures a sufficient seal to allow the introduction of gas and/or of the mineralized solution into the capsule for beverages 300 without substantial leakages.

FIG. 11 shows an embodiment wherein the seal is realized in correspondence of the head wall 300*t* of the head portion 302; in this last case, it is the injection or filling pipe 401 that allows a sufficient seal to ensure the introduction of gas and/or of the mineralized solution into the capsule for beverages 300 without substantial leakages. The contact area A in this last case is between the injection or filling pipe 401 and the head wall 300*t*.

In particular, it is observed that in FIG. 11 is shown a particular embodiment of the machine wherein within the injection or filling pipe 401 is present a pin 402 movable with respect to the latter, in particular sliding with respect to the latter. The pin 402 translates between a first and a second position in a linear way along a direction substantially aligned to the axis Y for sliding until in correspondence of the seal 305 for aiding its movement from the first position towards the second position.

When the capsule for beverages 300 and the injection or filling pipe 401 or the capsule for beverages 300 and the striking flange 204 are properly brought into contact in correspondence of the reciprocal contact areas A, a gas or mineralized solution flow is started so as to cause an appropriate filling of the capsule for beverages.

In a non-limiting embodiment, the gas used for the filling of the capsule for beverages 300 is said mineral solubilization gas G, and in particular is carbon dioxide ($CO_2$). Thanks to this aspect, the mineralized solution is preserved.

When the gas or mineralized solution flow is interrupted or the pressure exerted by them in the injection or filling pipe 401 descends under the pressure assumed within the capsule for beverages 300, by effect of the elastic element 304 the seal 305 assumes again the first position, and the capsule for beverages 300 results insulated from the external environment and provided with a properly pressurized mineralized solution. The orifice 306 is closed.

The capsule for beverages 300 can be emptied with a pin similar to the pin 402 previously described.

Where the capsule for beverages 300 is provided with said connector, preferably also the machine here described will be provided with a connector configured for allowing a removable coupling, in particular a locking, of the capsule for beverages 300 in correspondence of said seat 200, 200'. In a non-limiting embodiment, the connector of the machine can in particular be installed in substantial correspondence of the striking flange 204.

It is finally observed that the device 1 for the water treatment and the machine here described can be integrated in a unique apparatus or be operatively connected the one with the other. When operatively connected the one with the other, the apparatus results capable of realizing mixtures highly enriched with properly solubilized minerals and results capable of supplying capsules for beverages 300 opportunely loaded with strongly mineralized mixtures whose minerals are properly solubilized.

It is observed that the invention disclosure is not limited to the attached embodiments. It is finally clear that to the object of the present disclosure can be applied additions, modifications or variants, obvious for an expert in the art, without departing for this reason from the scope of protection provided by the annexed claims.

The invention claimed is:

1. A capsule for beverages, comprising a body having a head portion and a bottom portion and suitable for defining a cavity configured for containing, in use, a fluid and/or a gas;

said capsule for beverages comprising an orifice configured for allowing the release of said fluid and/or gas from the cavity;

said capsule for beverages comprising a seal movable between at least a first position suitable for determining a closing of the orifice configuring the capsule for beverages in a closed or sealed operating configuration wherein the cavity is insulated, and a second position suitable for determining an opening of the orifice configuring the capsule for beverages in an open operating configuration wherein the cavity is accessible from the outside of the capsule for beverages;

the capsule for beverages being configured for remaining, in rest conditions, in said closed operating configuration keeping the seal in said first position;

said capsule comprising an elastic element configured for keeping the seal in said first position in a rest configuration, the elastic element being interposed between the bottom portion and the seal.

2. The capsule according to claim 1, configured for allowing the movement of the seal from said first position to said second position and/or for switching between said closed operating configuration and said open operating configuration by means of an external force;

wherein the seal is positioned within said cavity in substantial correspondence of the orifice, wherein the body of the capsule for beverages comprises a striking wall for said seal; said striking wall surrounding the orifice; in said first position the seal being in contact with said striking wall;

wherein in said closed operating configuration the cavity is pressurized;

and/or wherein the seal is configured for moving between said first position and said second position through at least one between: a translation movement and a rotation movement.

3. The capsule according to claim 1, showing a substantially axial development along a maximal extension direction, and wherein the bottom portion is opposed with respect to the head portion along said maximal extension direction;

the bottom portion comprising at least a bottom wall and the head portion comprising at least a head wall, at least one between the bottom wall and/or the head wall being inclined or orthogonal, with respect to the maximal extension direction, the orifice being positioned in substantial correspondence of the head portion, said head portion detecting an end portion of said cavity having tapered cross section with respect to a central portion of said cavity, and wherein the seal shows a lower cross section with respect to the cross section of said head portion.

4. The capsule according to claim 1, wherein said seal is realized in a flexible material; said flexible material comprising a polymeric material, and/or wherein the body of the capsule for beverages comprises at least a portion demountable for allowing an operating access to said cavity; said demountable portion being optionally said bottom portion.

5. The capsule according to claim 1, wherein said elastic element is configured for exerting a force on the seal such as to force the keeping of said first position by withstanding the movement of the seal from said first position to said second position;

and wherein the elastic element comprises at least a spring having a portion, in particular an end, fixed to said seal.

6. The capsule according to claim 5, wherein said elastic element is configured for being compressed when the capsule passes from said closed operating configuration to an open operating configuration.

* * * * *